(12) United States Patent
Ohtomo et al.

(10) Patent No.: US 6,756,581 B2
(45) Date of Patent: Jun. 29, 2004

(54) DEVIATION DETECTING DEVICE, ROTARY LASER APPARATUS WITH THE SAME, AND POSITION DETERMINING SYSTEM WITH DEVIATION DETECTING/CORRECTING DEVICE

(75) Inventors: Fumio Ohtomo, Itabashi-Ku (JP); Jun-ichi Kodaira, Itabashi-Ku (JP)

(73) Assignee: Kabushiki Kaisha Topcon, Tokyo (JP)

( * ) Notice: Subject to any disclaimer, the term of this patent is extended or adjusted under 35 U.S.C. 154(b) by 381 days.

(21) Appl. No.: 10/000,016

(22) Filed: Dec. 4, 2001

(65) Prior Publication Data

US 2002/0092978 A1 Jul. 18, 2002

(30) Foreign Application Priority Data

Dec. 4, 2000 (JP) ........................................ 2000-368335

(51) Int. Cl.[7] ................................................ G01B 11/26
(52) U.S. Cl. ............................ 250/231.13; 250/206.2; 356/139.07; 356/141.3; 356/255
(58) Field of Search ........................... 250/206.1, 206.2, 250/206.3, 231.13; 356/250, 255, 3.12, 4.08, 138, 139.1, 139.07, 141.1, 141.3, 152.1, 152.2; 175/4.5; 359/205, 820, 822; 33/291, DIG. 21

(56) References Cited

U.S. PATENT DOCUMENTS

| | | | |
|---|---|---|---|
| 4,468,119 A | 8/1984 | Hamar | |
| 5,110,202 A | 5/1992 | Dornbush et al. | |
| 5,774,211 A | * 6/1998 | Ohtomo et al. | ........... 356/141.2 |
| 5,898,490 A | * 4/1999 | Ohtomo et al. | ........... 356/141.3 |
| 5,994,688 A | 11/1999 | Jackson et al. | |
| 6,046,799 A | 4/2000 | Lysen | |
| 6,433,866 B1 | * 8/2002 | Nichols | .................... 356/141.1 |
| 6,493,067 B1 | * 12/2002 | Kodaira et al. | ............. 356/4.08 |
| 2001/0035946 A1 | * 11/2001 | Nakase et al. | .............. 356/4.01 |
| 2002/0060788 A1 | * 5/2002 | Ohtomo et al. | ........... 356/139.1 |

FOREIGN PATENT DOCUMENTS

| | | |
|---|---|---|
| DE | 24 45 635 | 4/1976 |
| DE | 136 417 | 7/1979 |
| JP | 06026861 | 2/1994 |

* cited by examiner

Primary Examiner—Stephone B. Allen
(74) Attorney, Agent, or Firm—Jacobson Holman PLLC

(57) ABSTRACT

The present invention is directed to a deviation detecting device that detects a deviation angle of a rotary unit of a laser light projector relative to a projector body. The deviation detecting device (190) includes a light emitter (193) attached to the projector body of the laser light projector for emitting laser light, a reflector (195) attached to the rotary unit of the laser light projector for reflecting light emitted from the light emitter, and a light receiving unit (194) attached to the projector body of the laser light projector for receiving the light reflected by the reflector. In the deviation detecting device, a position at which the light reflected by the reflector is incident upon the light receiving unit is utilized to determine a deviation angle of the rotary unit relative to the projector body.

5 Claims, 27 Drawing Sheets

(a)

(b)

(c)

(a)

(b)

DEVIATION DETECTING DEVICE, ROTARY LASER APPARATUS WITH THE SAME, AND POSITION DETERMINING SYSTEM WITH DEVIATION DETECTING/CORRECTING DEVICE

FIELD OF THE INVENTION

The present invention relates to a deviation detecting device, a rotary laser apparatus with the same, and a position determining system with a deviation detecting/correcting device, and more particularly, it relates to a deviation detecting device that detects a deviation angle of a rotary unit of a laser light projector rotating and emitting laser light, a rotary laser apparatus that comprises such a deviation detecting device, and a position determining system.

PRIOR ART

An optical leveling apparatus has been replaced with a rotary laser apparatus for producing a horizontal reference level in a wide measurement range.

In recent years, the rotary laser apparatus has been increasingly used for the purpose of measurement on elevation and depression angles, especially in order to produce lines and planes on reference elevation and depression angles. The rotary laser apparatus revolves, reciprocally sweeps, and/or stops while emitting laser beam in horizontal directions, so as to produce rotation reference plane, reference segment, reference plane, reference line, and/or reference point. A position determining system has also been used together, which receives laser beam emitted from the rotary laser apparatus to determine a position.

A prior art embodiment of such a rotary laser apparatus capable of producing an inclination reference plane is disclosed in Japanese Patent Laid-Open No. H6-26861. Configuration and features of the prior art rotary laser apparatus will be outlined below.

Referring to FIG. 32, a rotary laser apparatus 951 includes a casing 901 and a laser light projector 903. A concavity 902 shaped in a truncated cone is defined centrally in a top of the casing 901. The laser light projector 903 vertically extends through the center of the concavity 902. The laser light projector 903 is supported at the concavity 902 where a spherical mount 904 provided in the middle of the laser light projector 903 permits it to tilt. The laser light projector 903 has a projector body 920 with projector optics build therein, and a rotary unit 905 having a pentaprism 909 rotatably attached to the projector body 920. The rotary unit 905 is revolved through a drive gear 907 and a sweep gear 908 actuated by a motor 906.

Two sets of inclination mechanisms 910 (only one of which is shown) are positioned around the laser light projector 903. The inclination mechanism 910 actuated by a motor 911 allows the laser light projector 903 to tilt in a direction as required.

The projector body 920 has a laser light projector (not shown) and projector optics (not shown) built therein, and the projector optics includes a collimator lens that collimates incident laser beam from the laser light projector. The laser beam from the projector optics is deflected in horizontal directions by the pentaprism 909 and projected out of a projector window 931.

In operation, the inclination mechanisms 910 adjust an inclination angle at which the laser beam is to be emitted. After being deflected by the pentaprism 909 in a direction orthogonal to a rotation axis of the rotary unit 905, the laser beam is emitted from the laser projector 903 while the rotary unit 905 is being revolved or reciprocally swept in a predetermined angular range, so as to produce an inclined reference plane.

Since the rotary unit 905 of the laser projector 903, which surrounds the pentaprism 909, is rotatably attached to the projector body 920, it is unavoidable that some mechanical maladjustment is caused between the projector body 920 and the rotary unit 905. Resultantly, the rotary unit 905 is in misalignment with the projector body 920, or with the projector optics. Disadvantageously, such s misalignment or deviation angle leads to alteration in a direction in which the laser beam is emitted, or causes errors in a plane produced and a position determined.

Accordingly, it is an object of the present invention to provide a deviation detecting device that detects a deviation angle of a rotary unit of a laser light projector relative to a projector body, and also to provide a rotary laser apparatus incorporated with the deviation detecting device and a position determining system.

It is another object of the present invention to provide a rotary laser apparatus and a position determining system that cooperatively function to use a deviation angle detected by the deviation detecting device and correct a position determined or a plane defined on the detected deviation angle.

SUMMARY OF THE INVENTION

To accomplish the above objects, the present invention provides a deviation detecting device that comprises a light emitter attached to a projector body of a laser light projector emitting laser beam, a reflector that is attached to the projector body of the laser light projector for reflecting light emitted from the emitter, and a light receiving element that is attached to the projector body of the laser light projector for receiving light reflected by the reflector, and the deviation detecting device detects a deviation angle of the rotary unit relative to the projector body from a position of light reflected by the reflector and incident upon the light receiving element.

In such a configuration, the light emitted from the light emitting element, after being reflected by the reflector attached to the rotary unit of the laser light projector, is incident upon the light receiving element attached to the projector body of the laser light projector. As the rotary unit of the laser light projector alters in a relative position with the projector body, the light incident upon the reflector is reflected in a varied direction, resulting in the reflected light being incident upon the light receiving element at a varied position. Sequentially sensing the varied position permits a detection of deviation of the rotary unit of the laser light projector.

Preferably, the deviation detecting device according to the present invention further comprises a first capacitor lens used to collimate the light emitted from the light emitter and direct collimated beam at the reflector, and a second capacitor lens used to converge the light reflected by the reflector so as to be incident upon the light receiving element.

With this configuration, the light emitted from the light emitter is redirected in collimated beam at the reflector, and hence, vertical displacement of the reflector would not vary the resultant beam reflected therefrom. This enables the deviation detecting device to detect only an inclination of the reflector.

The light receiving element may be a quadrant, a semiconductor position detector, or a CCD.

Also, the present invention provides a rotary laser apparatus, in combination with the deviation detecting device, which comprises a light projector having a projector body and a rotary unit, and a casing surrounding the projector, so as to emit laser beam originated from the projector while rotating the laser beam, and the projector advantageously has the deviation detecting device.

Moreover, the present invention also provides a position determining system, in combination with a deviation detecting/correcting device, which comprises a rotary laser apparatus and a light sensor receiving laser light emitted from the rotary laser apparatus, so as to determine a position of the laser light incident upon the light sensor and obtain a resultant value of the determined position or use the resultant value to define a plane, and the rotary laser apparatus is a rotary laser apparatus in combination with the deviation detecting device while the light sensor includes an arithmetic operation unit that uses the deviation angle detected by the deviation detecting device to correct the value of the determined position.

With this configuration, the deviation detecting device attached to the rotary laser apparatus detects a deviation angle of the rotary unit of the laser light projector built in the rotary laser apparatus. The detected deviation angle is transmitted to the light sensor. The arithmetic operation unit in the light sensor uses the deviation angle to correct the value of the determined position.

DETAILED DESCRIPTION OF THE PREFERRED EMBODIMENTS (1) Embodiment 1

A first preferred embodiment of a position determining system in combination with a deviation detecting device will now be described according to the present invention.

(1.1) Configuration of Position Determining System

Figure 1:
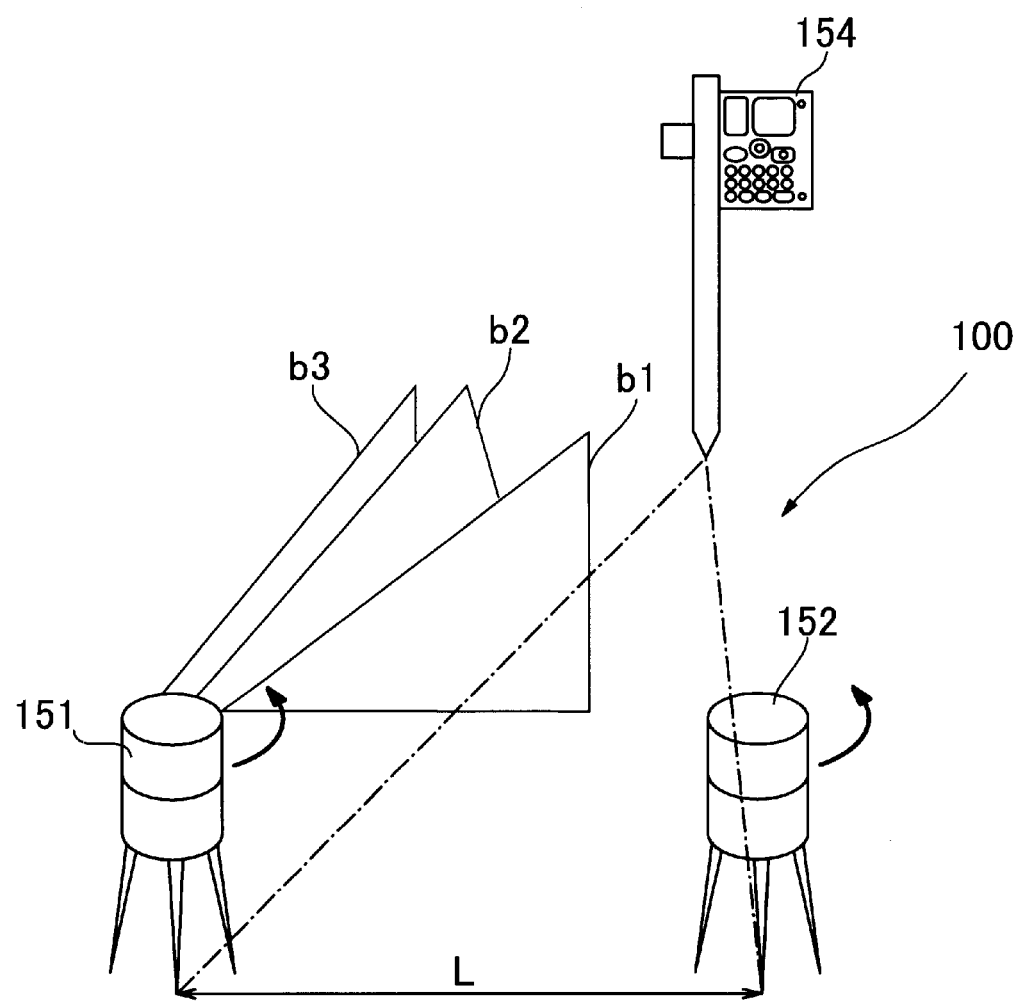
FIG. 1 is a perspective view showing the entire configuration of an embodiment of a position determining system according to the present invention, including a deviation detecting device.

FIG. 1 illustrates the entire configuration of the first embodiment of the position determining system in combination with the deviation detecting device according to the present invention. The position determining system 100 is comprised of two rotary laser apparatuses 151, 152 respectively having means for emitting three diverging laser beams b1, b2, b3 while rotating them, and a light sensor 154 that receives the laser beams b1, b2, b3 emitted from the rotary laser apparatus 151, 152, respectively. The rotary laser apparatuses 151, 152 respectively have the deviation detecting devices (not shown) of the first embodiment built in them. The rotary laser apparatuses 151, 152 also emit laser beams S, respectively, to send information about directions to which the diverging laser beams are being emitted.

(1.1.1) Rotary Laser Apparatuses

Figure 2:
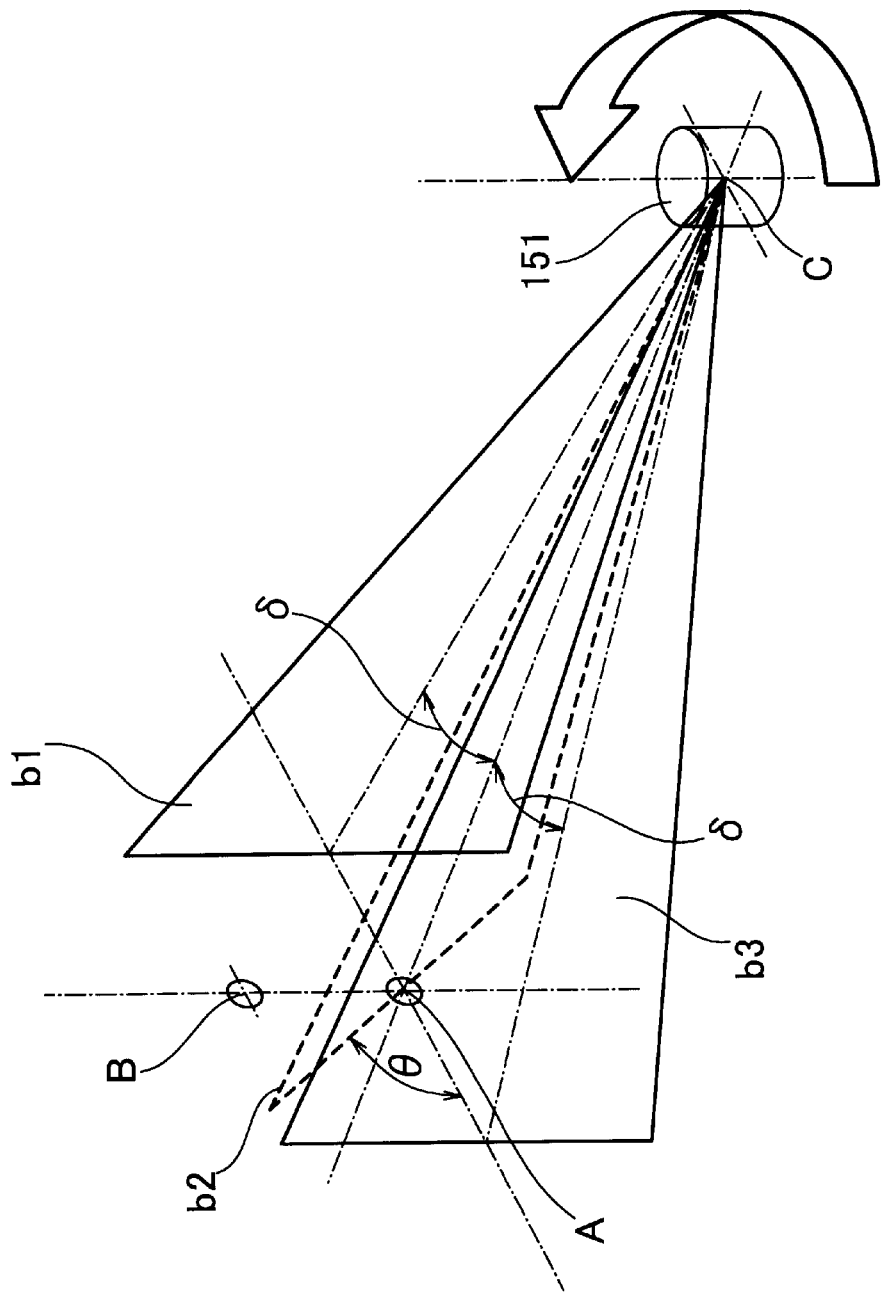
FIG. 2 is a perspective view showing an arrangement of three diverging laser beams.
Figure 3:
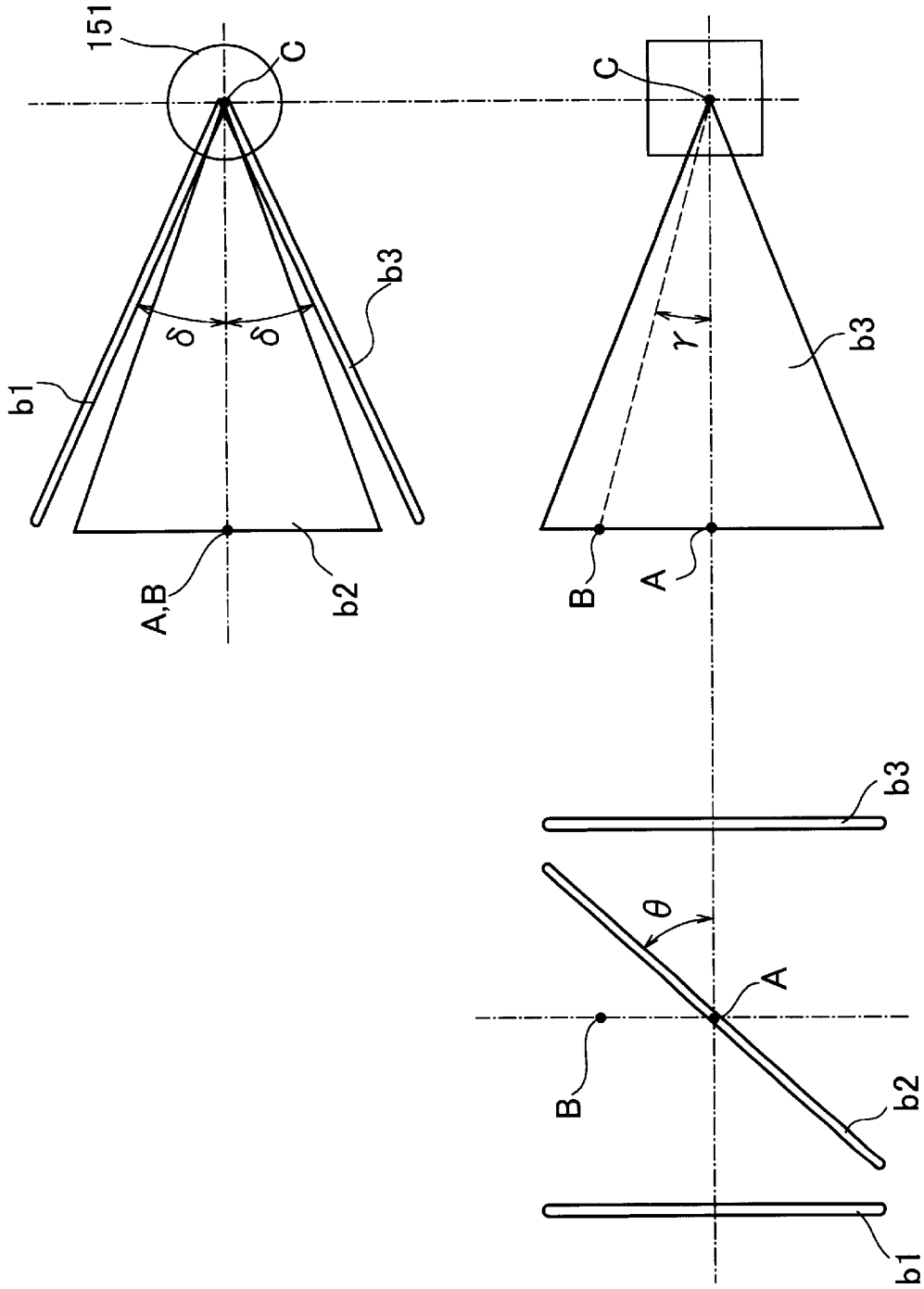
FIG. 3 shows three phases representing three arrangements of the diverging laser beams.

As shown in FIG. 2, the rotary laser apparatus 151 emits three of the diverging laser beams b1, b2, b3 while rotating them about a point C. As can be seen in FIG. 3, the diverging beams b1, b3 spread perpendicular to a horizontal plane while the diverging beam b2 spreads, meeting the horizontal plane at an angle □. An intersecting line of the diverging beam 2 with the horizontal plane bisects an angle at which the diverging beam b1 meets the diverging beam b3. In other words, the intersecting line meets the diverging beams b1 and b3, respectively, at the same angle □. The three diverging beams b1, b2, b3 are rotated in such relations to one another, and therefore, the diverging beams b1, b2, b3 hit the light sensor 154 at some delays of time, one after another. In this embodiment, since two of the rotary laser apparatuses 151, 152 are designed to have the same configuration and arrangement, merely one of them, the rotary laser apparatus 151, will be referenced hereinafter.

Then, rotating mechanism that rotates three of the diverging beams will be described.

Figure 4:
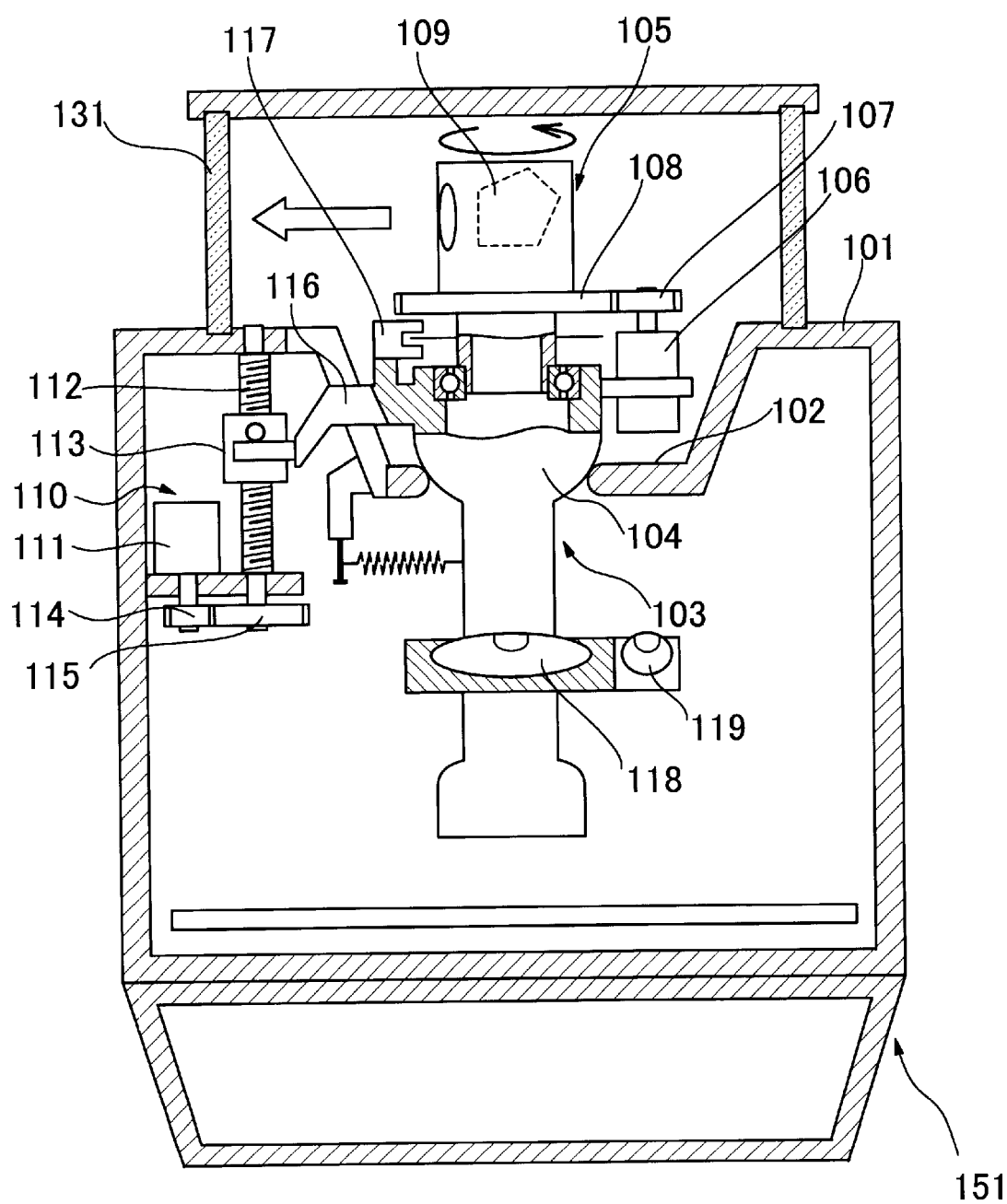
FIG. 4 is a sectional side view showing an inclination mechanism of a rotary laser apparatus.

As illustrated in FIG. 4, the rotary laser apparatus 151 includes a casing 101 provided with a light projecting window 131, a laser light projector 103 serving as a revolving/emitting means, a deviation detecting device (not shown) of an embodiment according to the present invention, and a transmitter 123 signaling a deviation angle detected by the deviation detecting device to a light sensor 154. A concavity 102 defined in a shape of truncated cone is provided in the center of a top of a casing 101. The laser light projector 103 extends vertically through the center of the concavity 102. The laser light projector 103 is provided with a spherical mount 104 seated and hung on the concavity 102 so that the projector can tilt itself. The laser light projector 103 includes a rotary unit 105 capable of revolving and having a pentaprism 109. The rotary unit 105 is revolved through a drive gear 107 and a sweep gear 108 actuated by a motor 106. A rotation angle of the rotary unit 105 is detected by an encoder 117 attached to the laser light projector 103. While revolving, the rotary unit 105 has its deviation angle detected by the deviation detecting device (not shown). Data on the rotation angle and deviation angle thus detected are transmitted to the light sensor 154.

The rotary laser apparatus 151 has two sets of inclination mechanisms placed around the laser light projector 103 (one of the sets alone is shown). One of the sets of the inclination mechanisms 110 has a motor 111, a screw 112, and a nut 113 used all together for inclining feature. The motor 111 is capable of turning the screw 112 through a drive gear 114 and a tilting gear 115. Turns of the screw 112 cause the nut 113 to move up and down. Such vertical movement of the nut 113 brings about inclination of the laser light projector 103. The other of the sets of the inclination mechanisms uses similar mechanical components to incline the projector 103 in a direction orthogonal to that in which the inclination mechanism 110 tilts.

A fixed sensor 118 positioned in parallel with an arm 116, and a fixed sensor 119 positioned perpendicular to the arm 116 are located in the middle of the laser light projector 103. The arm 116 has its inclination adjusted by the inclination mechanism 10 so that the fixed sensor 118 can always assume horizontal posture. Simultaneously, the other set of the inclination mechanism is used for adjustment to permit the fixed sensor 119 to always assume its horizontal posture.

Figure 5:
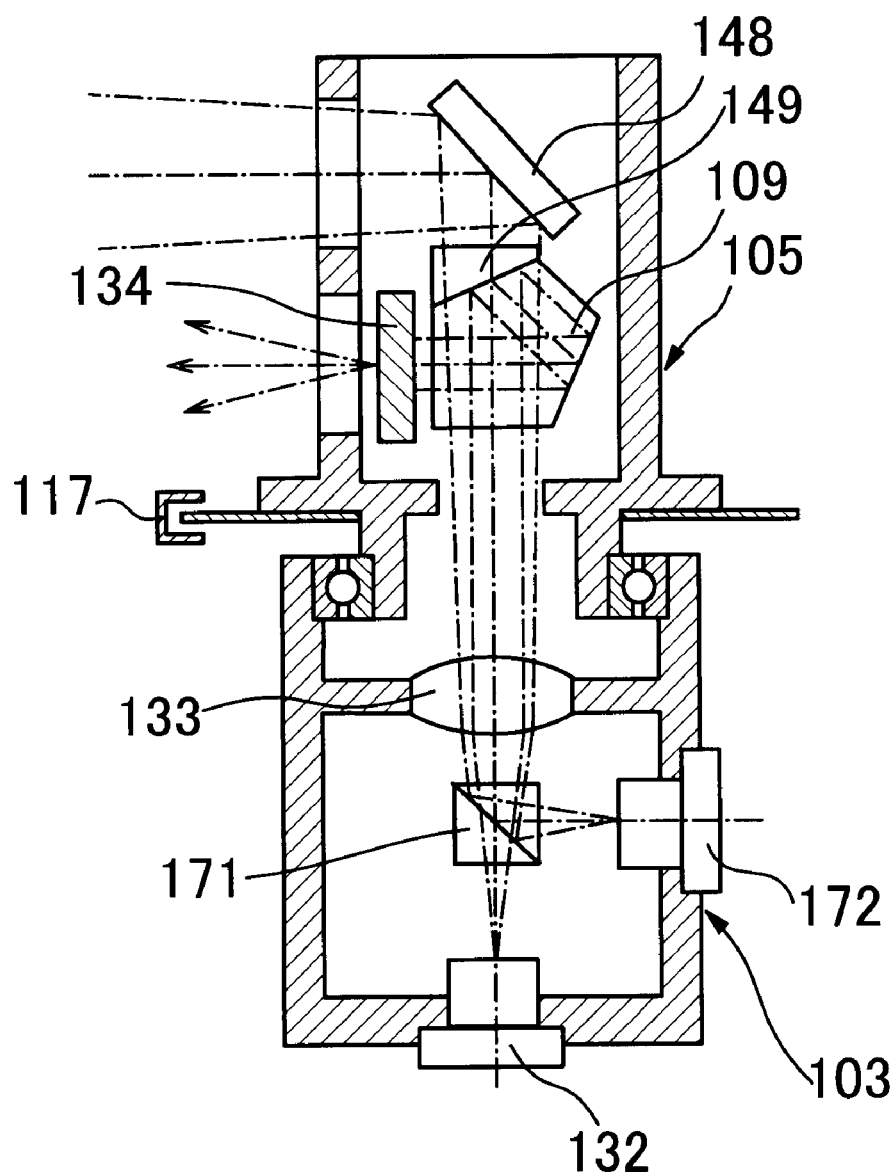
FIG. 5 is a sectional side view showing a projector incorporated in the rotary laser apparatus.

The laser light projector 103 will now be detailed. As shown in FIG. 5, the laser light projector 103 has a projector body 120 and the rotary unit 105. The projector body 120 has projector optics that includes a diverging laser beam projector 132, a die clock prism 171, and a collimator lens 133 collimating incident laser beam from the laser beam projector 132. The projector body 120 is further loaded with a deviation detecting device 190. The rotary unit 105 includes a pentaprism 109 that deflects, by 90°, laser beam exiting the projector optics, a diffraction grating (BOE) 134 that splits the beam deflected by the pentaprism 109, into three diverging beams b1, b2, b3, and a protractor disk 195 that reflects light emitted from the deviation detecting device 190.

The laser light projector 103 further includes an angular signal laser light projector 172 serving to transmit information on angles, a die clock prism 149 attached to the pentaprism 109, and a mirror 148 that deflects laser beam S transmitted through the die clock prism 149. The angular signal laser light projector 172 emits the laser beam S used to carry information on rotation angles detected by the encoder 117 and information on deviation angles detected by the deviation detecting device 190 and send them to the light sensor 154. However, laser light used to carry the information on rotation angles may be replaced with other light source such as LED.

Figure 6:
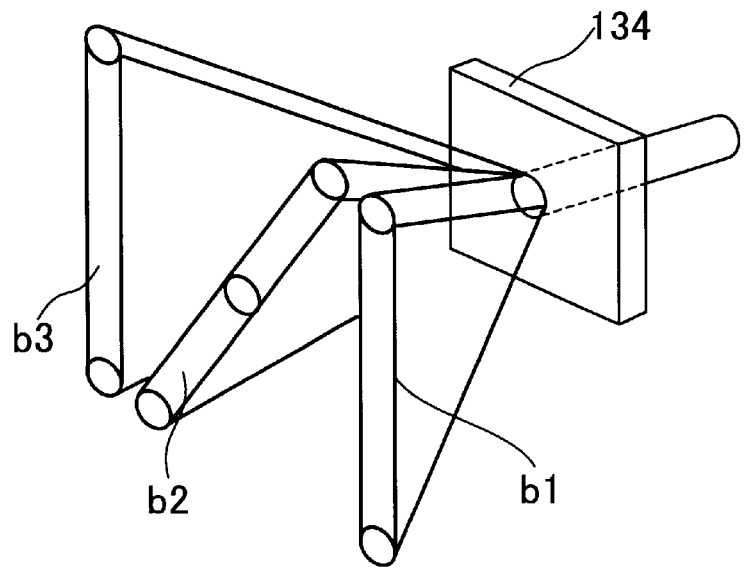
FIG. 6 is a perspective view showing a manner where a single ray of laser beam is split into three of the diverging laser beams by a diffraction grating.

The laser light emitted from the diverging laser light projector 132 is transmitted trough the die clock prism 171, then collimated by the collimator lens 133, and further deflected by 90° by the pentaprism 109. As shown in FIG. 6, the laser light 90° deflected by the pentaprism 109, after being split into three diverging beams b1, b2, b3 by the diffraction grating 134, is emitted from the laser light projector 103. On the other hand, the laser beam S emitted from the angular signal light projector 172 is reflected by the die clock prism 171 and directed at the collimator lens 133. Since a position where the angular signal light projector 172 is attached is not within a focal range of the collimator lens 133, the laser beam S emitted from the angular signal light projector 172, after passing through the collimator lens 133, is not collimated but is spread to some extent. The laser beam S transmitted through the collimator lens 133 is further transmitted through the pentaprism 109 and the die clock prism 149, and thereafter, they are reflected by the mirror 148 and then emitted out of the projector 103.

Figure 7:
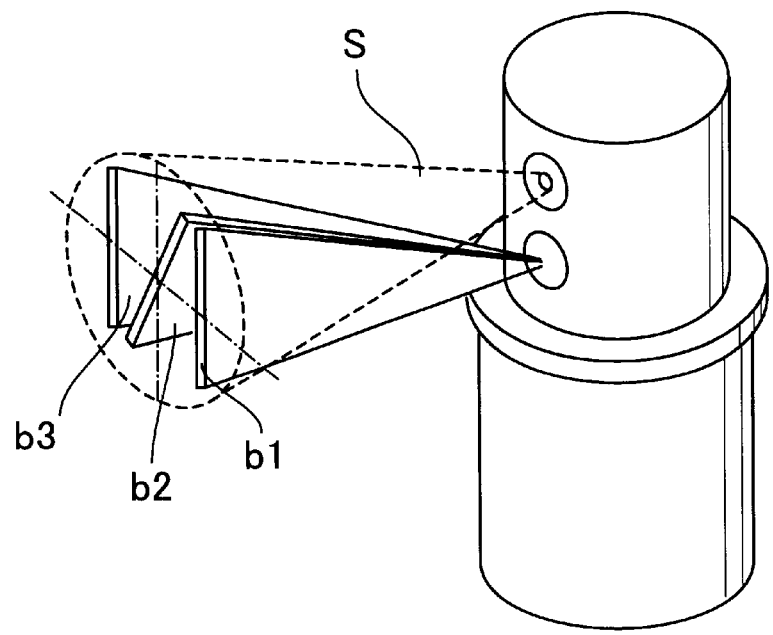
FIG. 7 is a perspective view showing a positional relation of the three diverging laser beams with laser beam carrying an angular signal.

As can be seen in FIG. 7, the laser light projector 103 emits the laser beam S carrying angular signals and the diverging beams b1, b2, b3 in the same direction. The diverging laser light projector 132 and the angular signal light projector 172 are designed, for instance, to emit laser beam of wavelength varied from each other, so that the light sensor 154 receiving the beams can distinguish the laser beam S from the diverging beams b1, b2, b3, respectively. Moreover, the laser beam S transmitting angular signals spreads at an angle sufficient to cover the entire range where the diverging beams b1, b2, b3 can be used to determine positions. The laser beams S emitted respectively from the rotary laser apparatuses 151 and 152 are modulated differently from each other (i.e., designed to flicker at different frequencies from each other) so as to distinguish one from the other. Instead, the laser beams S emitted respectively from two of the rotary laser apparatuses can be varied in wavelength (color).

(1.1.2) Deviation Detecting Device

Figure 8:
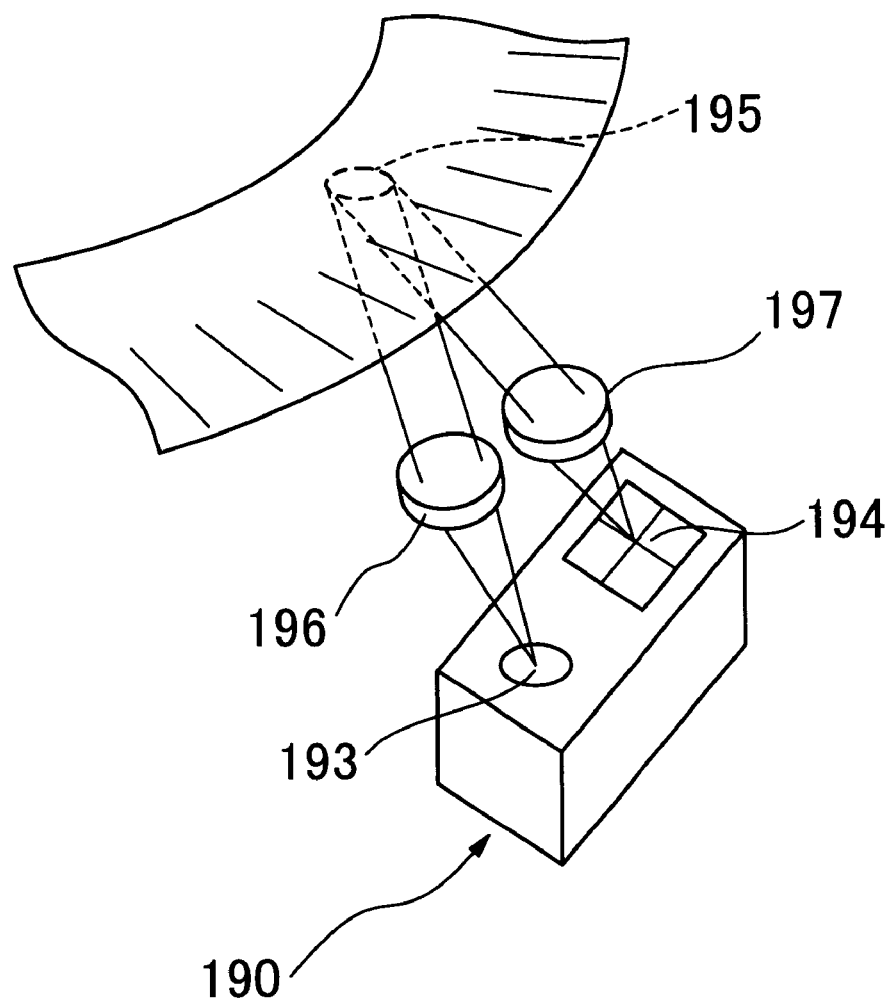
FIG. 8 is a perspective view showing an embodiment of a deviation detecting device according to the present invention.

Referring to FIG. 8, a deviation detecting device 190 attached to the laser light projector 103 will now be described. The deviation detecting device 190 is comprised of a light emitter 193 that emits laser beam H to detect deviation angles, a capacitor lens 196 that collimates the laser beam H emitted from the light emitter 193, a protractor disk 195 that is attached to the rotary unit 105 to serve as a reflector, a light receiving capacitor lens 197 that converges the laser beam H reflected from the protractor disk 195, and a light receiving unit 194 that receives the laser beam H converged by the capacitor lens 197. The light receiving unit 194 may be a positioning sensor such as a quadrant, a semiconductor position detector (PSD), or a CCD.

(1.1.3) Light Sensor

Figure 9:
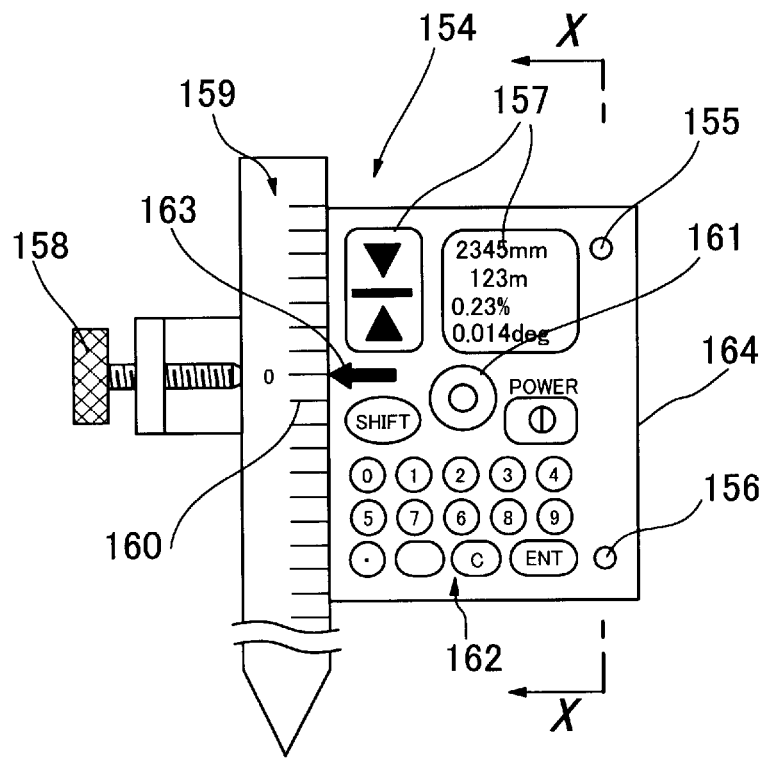
FIG. 9 is a front view showing a light sensor.
Figure 10:
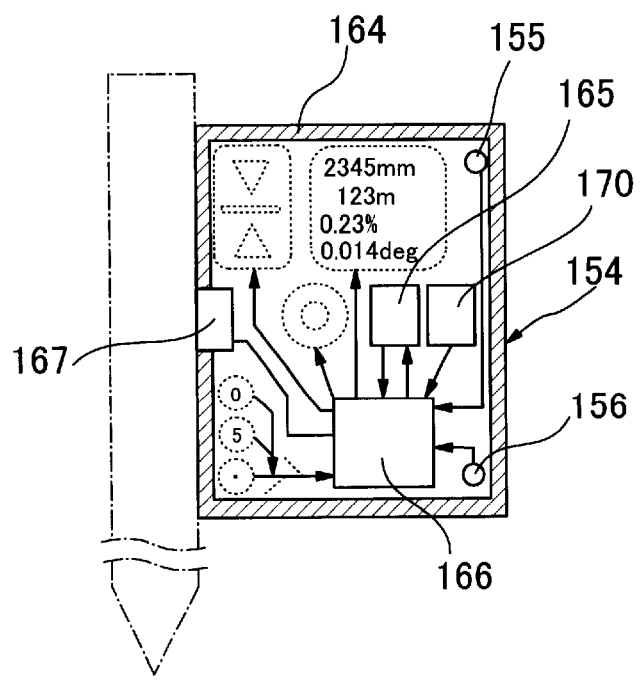
FIG. 10 is a sectional front view showing the light sensor.
Figure 11:
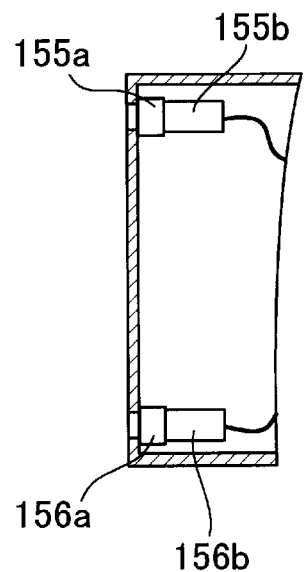
FIG. 11 is a sectional view taken along the line X—X of FIG. 9.

The light sensor 154, which is used to receive three of the diverging beams b1, b2, b3 emitted respectively from the rotary laser apparatuses 151 and 152, will now be described. FIG. 9 is a frontal view showing the light sensor, FIG. 10 is a sectional view of the same, and FIG. 11 is a sectional view of the same taken along the line X—X of FIG. 9. A box 164 of the light sensor 154 has a light receiving unit 156 that senses the diverging beams b1, b2, b3, and a light receiving element 155 that receives the laser beams S carrying information on rotation angles from the rotary laser apparatuses 151 and 152. The cabinet 164 further includes a display 157, an alarm 161 such as a buzzer, entry keys 162, an index 163, a rod 159 having a scale 160, and a fixed knob 158. Additionally, the box 164 is incorporated with a memory 165, an operational unit 166, a scale reader 167, and a signal receiver 170 that receives signals carrying information on deviation angles.

The light receiving unit 156 is provided with a filter 156a that is transparent to the diverging beams b1, b2, b3 but opaque to the laser beam S carrying an angular signal, and a light receiving element 156b that detects light transmitted through the filter 156a. Similarly, the light receiving unit 155 is provided with a filter 155a that transmits only the laser beam S carrying an angular signal, and a light receiving element 155b that senses light transmitted through the filter 155a.

(1.2) Theory of Measuring Positions (1.2.1) Principle of Measuring Elevation- and Depression-Angles First explained below will be a principle of measuring an elevation- or depression-angle, namely, an angle at which a straight line passing a center C of revolving movement of the diverging beams and also passing the light receiving unit 156 of the light sensor 154 meets a horizontal plane.

As stated above, the rotary laser apparatus 151 emits the diverging beams b1, b2, and b3 which rotate about the center C. As shown in FIG. 3, the diverging beam b2 is emitted, meeting the horizontal plane at an angle θ. An intersecting line of the diverging beam b1 with the horizontal plane meets an intersecting line of the diverging beam b3 with the horizontal plane at an angle 2δ. The three diverging beams b1, b2, and b3 revolves under such conditions, and hence, those diverging beams sequentially pass the light receiving unit 156 in the light sensor 154 at varying points of time in the order of b3, b2, and then b1.

Figure 12:
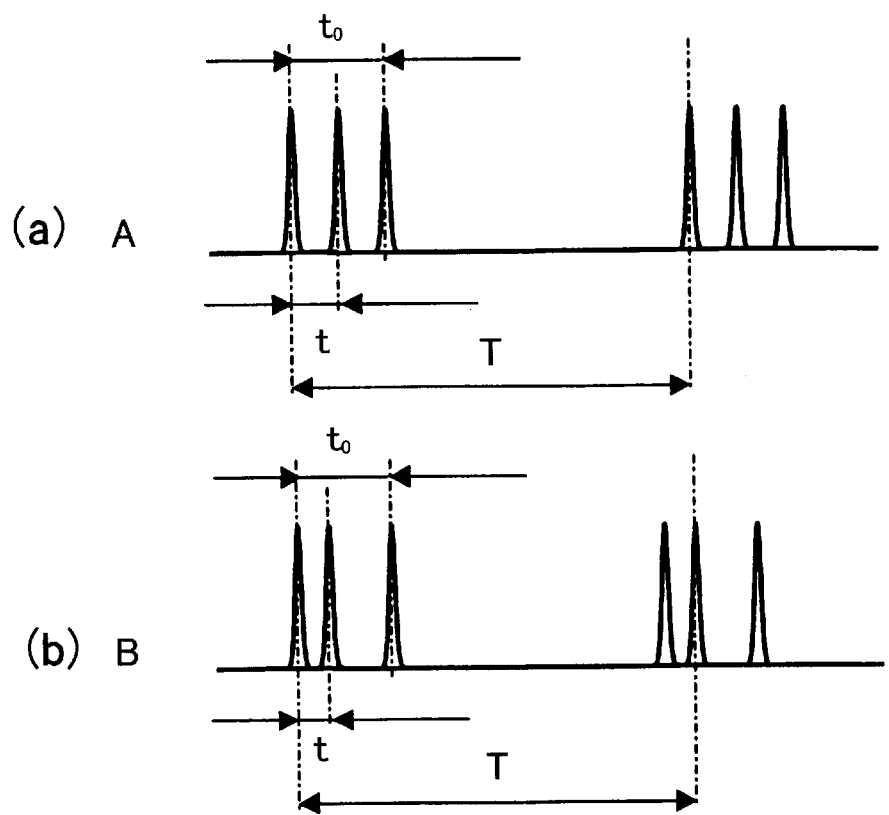
FIG. 12 is a graph representing signals for the diverging laser beams incident upon the light sensor.

When the light receiving unit 156 in the light sensor 154 is in a position A within the horizontal plane, light detected by the light sensor 154 can be depicted as in FIG. 12(a). Otherwise, when the light receiving unit 156 is in a position B translated vertically upward from the position A, the diverging beams can resultantly be detected as in FIG. 12(b). As illustrated in FIG. 12(a), two of the diverging beams b1 and b3 are sequentially detected with a time delay of $t_0$ after one of them that has first come is detected. The diverging beam b2 is detected with a time delay of t after the diverging beam b3 is detected. When the light receiving unit 156 is in the position A within the horizontal plane, the time delay t is a half of the time delay $t_0$ in duration. Thus, a relation can be expressed as in the following equation (1):

$$t_0 = 2t \qquad (1)$$

When the light receiving unit 156 is in the position B above the horizontal plane, the time delay t from one detection to another is shorter than a half of $t_0$ as can be recognized in FIG. 12(b). As the light receiving unit 156 is located farther above the horizontal plane, the time delay t between the detections becomes shorter, and the following equation (2) can be applied along with the time delay to obtain an angle ∠BCA=γ that is an angle at which a straight line passing the position B of the light receiving unit 156 and the diverging laser beam emitting point C meets the horizontal plane:

$$\gamma = \delta\left(1 - \frac{2t}{t_0}\right)\tan\theta \qquad (2)$$

When the light receiving unit 156 is located below the horizontal plane, the time delay t is longer than a half of the time delay $t_0$ in duration. Thus, it can be determined if the light receiving unit 156 is positioned above or below the horizontal plane. The equation (2) can be applied to a case where the light receiving unit 156 is located below the horizontal plane.

Alternatively, according to another principle of measurement as described later, after obtaining rotational angular positions at instances when the diverging laser beams are respectively received to calculate angles corresponding to the time delays t and $t_0$ between detections, the resultant angles may be substituted for t and $t_0$ in the equation (2) to obtain γ.

Measurement of the elevation- or depression-angle γ may similarly be carried out when the light sensor 154 receives the diverging laser beams b1, b2, and b3 emitted from the rotary laser apparatus 152. The elevation- or depression-angle γ obtained in relation with the diverging laser beams from the rotary laser apparatus 151 and that obtained in relation with the beams from the rotary laser apparatus 152 are averaged to improve a precision in measuring the elevation- or depression-angle. Alternatively, the present invention may be of a modified design in which only one of the rotary laser apparatuses can emit the diverging laser beams.

(1.2.2) Principle of Measuring Rotational Angular Positions

Then, now will be described a principle of measuring rotational angular positions or angular positions within the horizontal plane in which the light sensor 154 is located relative to the rotary laser apparatus 151.

An encoder 117 of the rotary laser apparatus 151 continuously performs real-time detection of rotation angles at which the rotary laser apparatus 151 emits the diverging beams b1, b2, and b3, respectively. Data on the detected rotation angles are converted into optical signals in a manner as mentioned below and then signaled from the angular signal developing laser beam projector 172, being carried by the laser beam S. The signaled laser beam S passes the optics in the projector 103 and exits from the rotary laser apparatus along with the diverging beams. The light receiving units 155 and 156 in the light sensor 154 respectively receive the diverging beams b1, b2, and b3 and the laser beam S. At an instance when the light receiving unit 156 receives the diverging beam b2, a rotation angular position of the light sensor 154 can be determined from the data on the rotation angles carried by the laser beam S incident upon the light receiving unit 155.

Figure 13:
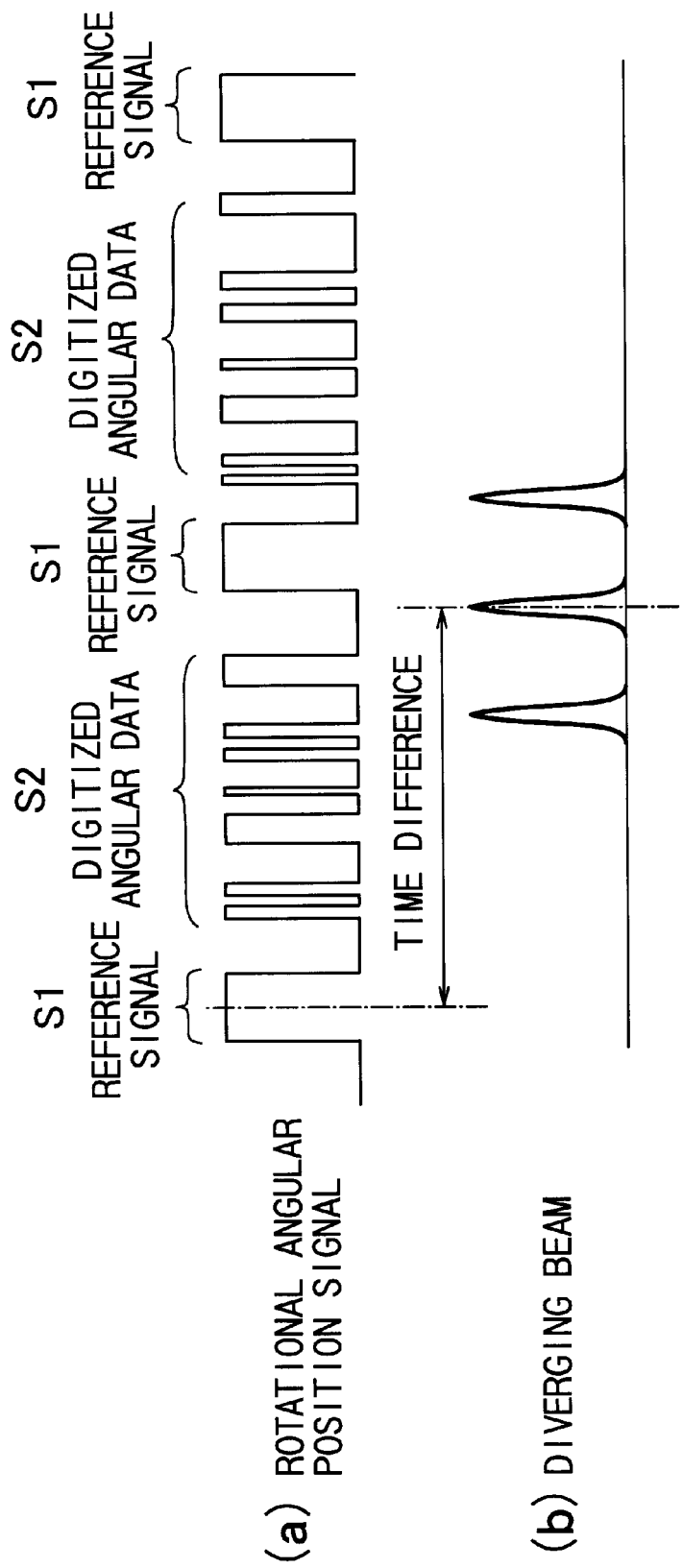
FIG. 13 is a graph representing signals carrying rotation angular positions.

Then, a method of converting the rotational angular data into an optical signal will be described. The angular signal developing laser beam projector 172 emits laser beam S varied in color (wavelength) from the diverging beams b1, b2, and b3, respectively. The laser beam S, flickering in a pattern as illustrated in FIG. 13(a), transmits data on a rotation angle or a rotational angular position. A signal depicted in FIG. 13(a) is composed of a reference signal S1 and a digitized signal S2 which is produced by digitizing the rotational angular position in a pattern of flickering beam. The reference signal S1 is emitted at constant intervals while the digitized signal S2 comes up and out between any two of the reference signals, in a pattern to represent a digitized code. The digitized code is a rotation angular position detected by the encoder 17 (FIG. 3) and then digitized.

The light sensor 154, when receiving a signal representing the rotational angular position, analyzes the digitized signal to obtain the rotational angular position. However, since the digitized signal S2 is intermittently transmitted at some intervals, the rotational angular position represents a merely approximate value. Hence, as shown in FIG. 13(b), a time delay between a point of time when the diverging beam b2 is received and a point of time when the reference signal S1 is received is utilized, and information on the rotational angular position is intermittently interpolated, so as to determine an angle more accurately.

(1.2.3) Principle of Determining Three-Dimensional Positions

Figure 14:
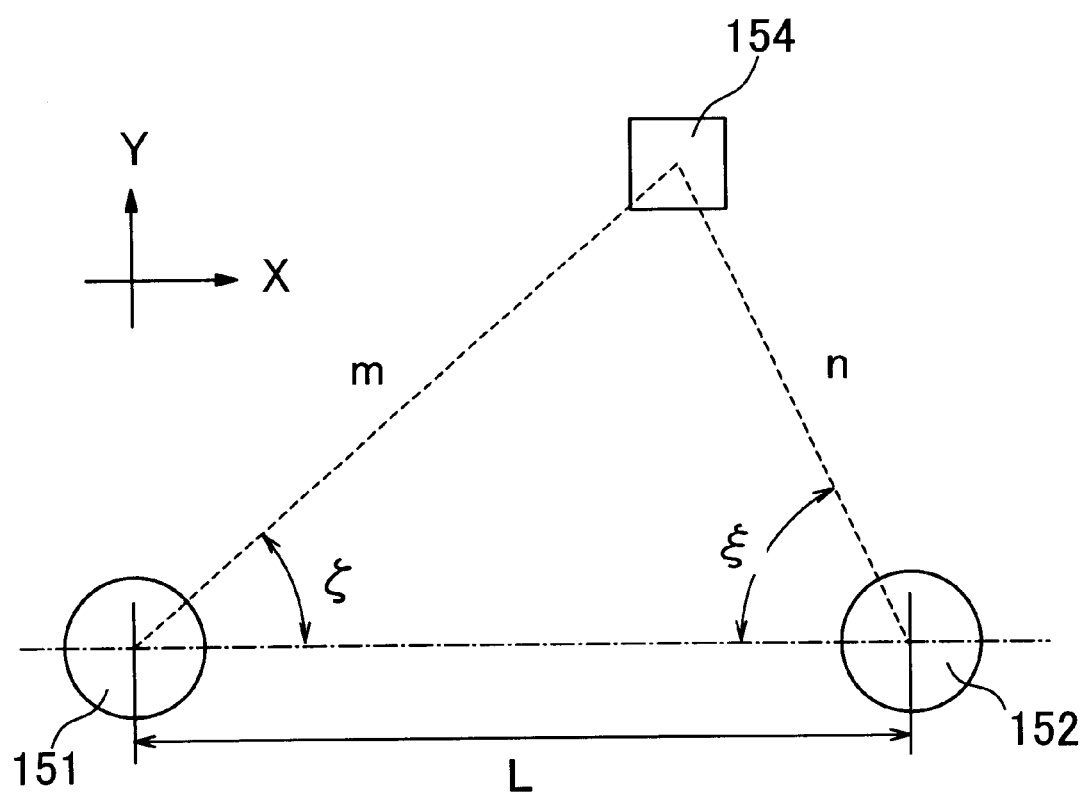
FIG. 14 is a diagram illustrating a theory of determining positions in a position determining system.

A principle of determining a three-dimensional position where the light sensor 154 lies will now be described. As shown in FIG. 14, both the rotary laser apparatuses 151 and 152 are disposed at a known interval L therebetween. The above mentioned determination principle can apply to determine rotational angular positions $\zeta$ and $\xi$ of the light sensor 154 relative to the rotary laser apparatuses 151 and 152, respectively. Assuming that m denotes a distance between the rotary laser apparatus 151 and the light sensor 154 while n denotes a distance between the rotary laser apparatus 152 and the light sensor 154, a relation will be established among the rotational angular positions $\zeta$ and $\xi$ and the distances L, m, and n as in the following equations (3):

$$\frac{L}{\sin(180-\varsigma-\xi)} = \frac{m}{\sin\varsigma} = \frac{n}{\sin\xi} \quad (3)$$

Thus, the distances m and n can be obtained based upon the following equation (4):

$$m = \frac{L\sin\varsigma}{\sin(180-\varsigma-\xi)} \quad (4)$$

$$n = \frac{L\sin\xi}{\sin(180-\varsigma-\xi)}$$

Assuming now that the original point is the point C of the rotation center of the rotary laser apparatus 151, the X-axis lies along an extension of the distance L, and the Y-axis lies along an extension perpendicular to the X-axis in a horizontal plane, X-coordinate x and Y-coordinate y in relation with the light sensor 154 can be obtained based upon an equation (5) as follows:

$$x = m\cos\zeta$$

$$y = m\sin\zeta \quad (5)$$

Z-coordinate z or a height z vertical to the horizontal plane can be obtained by applying the following equation (6) together with an elevation- or depression-angle γ calculated by the equation (2):

$$z = m\tan\gamma \quad (6)$$

When the original point is replaced with some other point, or when the X-, Y-, and Z-axes are settled in some other direction, the coordinates can be transformed in any known proper method to obtain a required three-dimensional position.

(1.2.4) Principle of Detecting Deviation Angles

As shown in FIG. 5, the rotary unit 105 of the light projector 103 is rotatably held by the projector body 120, and hence, minute mechanical maladjustment is unavoidable. Such maladjustment causes misalignment of an optical axis of the light emitting optics in the projector 103 with an optical axis of the rotary unit 105. When the rotary unit 105 is inclined within a plane where the optical axis of the light emitting optics and emission axes of the diverging laser beams are defined (any plane in parallel with a sheet face including FIG. 5), no error occurs in the emission directions of the diverging laser beams. Specifically, so far as the rotary unit 105 is inclined in parallel with that plane, the pentaprism 109 provided in the rotary unit 105 causes incident beam to deflect precisely by 90° even if an optical axis of the incident beam somewhat slants, and resultantly, no error is caused in the emission directions of the diverging laser beams.

However, when the rotary unit 105 is inclined perpendicular to the plane where the optical axis of the light emitting optics and the emission axes of the diverging laser beams are defined (any plane orthogonal with the sheet face including FIG. 5), errors occur in the emission directions of the diverging laser beams. The deviation detecting device of the embodiment according to the present invention detects such an inclination, namely, a deviation angle.

With reference to FIG. 8, the principle of detecting deviation angles will be described. The deviation angle detecting light emitter 193 of the deviation detecting device 190 emits laser beam H. The laser beam H is collimated by the capacitor lens 196 in the light emitter. The laser beam H collimated by the capacitor lens 196 is reflected by the protractor disk 195 attached to the rotary unit 105. The laser beam H reflected by the protractor disk 195, after being incident upon the capacitor lens 197, is converged. The laser beam H, after being converged by the capacitor lens 197, is incident upon the deviation angle detecting light receiving unit 194.

Due to the inclination of the rotary unit 105, the protractor disk 195 attached thereto is also inclined, and this results in the laser beam H being reflected in a varied direction. As the direction of the reflected laser beam H is varied, a position at which the laser beam H converged by the capacitor lens 197 is incident upon the light receiving unit 194 is also varied. Such a variation in the incident position of the laser beam H is detected by the light receiving unit 194 comprised of a positioning sensor, so as to determine a deviation angle.

Since the laser beam H is first collimated and then reflected by the protractor disk 195, the incident position of the laser beam H upon the light receiving unit 194 is not varied even when the protractor disk 195 is translated upward and downward without being inclined. Thus, the deviation detecting device 190 can detect only the inclination of the rotary unit 105.

(1.2.5) Principle of Correcting Errors Caused by Deviation Angles

The emission directions of the laser beams are varied due to the inclination of the rotary unit 105, and this causes errors in the rotational angular positions ζ and ξ, the elevation- or depression-angle γ, and the time delays t and $t_0$ between detections of the diverging laser beams. The principle of correcting errors caused in these values will be described below.

(1.2.5.1) Correction of Errors Caused in Rotational Angular Positions

Figure 15:
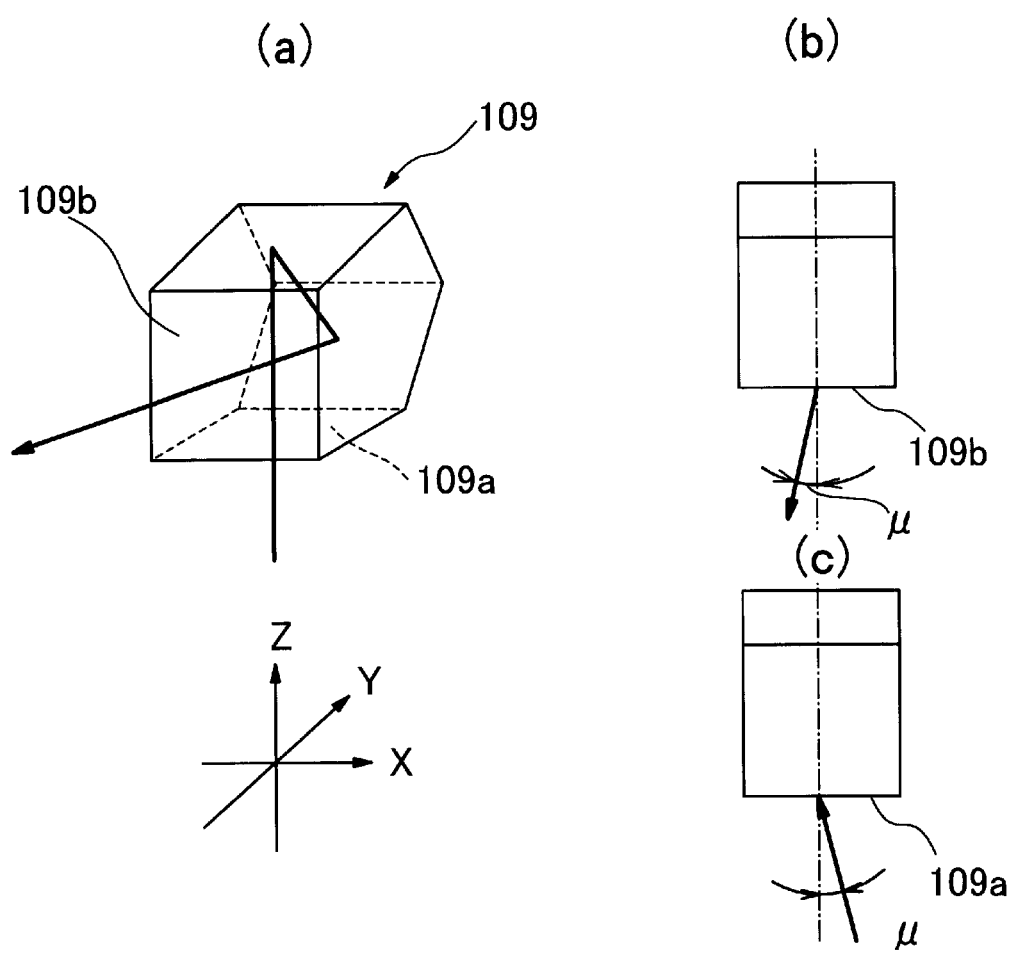
FIG. 15 is a diagram showing a relation of light incident upon a pentaprism with light exiting the same.

Referring to FIG. 15, correction of errors caused in the rotational angular positions ζ and ξ will be described. FIG. 15(a) is a perspective view of the pentaprism 109, FIG. 15(b) is a top plan view of the same, and FIG. 15(c) is a front view of the same. X-, Y-, and Z-axes are defined so that an XY plane becomes in parallel with an entrance face 109a of the pentaprism 109 while an XZ plane becomes in parallel with an exit face 109b.

As shown in FIG. 15(a), when the pentaprism 109 is not inclined, the light is incident upon the entrance face 109a in a direction of the Z-axis or at right angle and then goes out of the exit face 109b at right angle. In contrast, as shown in FIG. 15(c), when the light beam is incident upon the entrance face 109a at an angle □ in an XZ plane, the light beam exits at the angle □ in an XY plane, as shown in FIG. 15(b). This causes errors in resultant values of the determinations of the rotational angular positions ζ and ξ. An emission direction with an inclination at the angle □ in the XY plane causes errors in the rotational angular positions ζ and ξ determined in horizontal planes, as represented in the following equation:

$$\mu_h = \tan^{-1}(\tan \mu \cos \mu) \quad (7)$$

However, the angle □ is minute, and hence, a relation □$_h$≈□ is established.

Thus, the deviation detecting device 190 of the preferred embodiment of the present invention is used to detect a degree of the inclination □ of the deviation angle, namely, the incident angle, so as to correct the rotational angular positions ζ and ξ. Specifically, subtracting a value of the angle □$_h$ from the rotational angular positions ζ and ξ permits values of the rotational angular positions to be corrected. In correcting the values, the rotary laser apparatus 151 performs an arithmetic operation of subtracting the angle □$_h$ obtained by the deviation detecting device 190 from the rotational angular position ζ determined by the encoder 117 of the rotary laser apparatus 151, and a corrected value of the rotational angular position ζ is transmitted to the light sensor 154. Alternatively, after the angle □$_h$ obtained by the deviation detecting device 190 may be first transmitted to the light sensor 154, so that the light sensor 154 can carry out the arithmetic operation of correcting the rotational angular position ζ.

(1.2.5.2) Correction of Errors Caused in Elevation- and Depression-Angles

Figure 16:
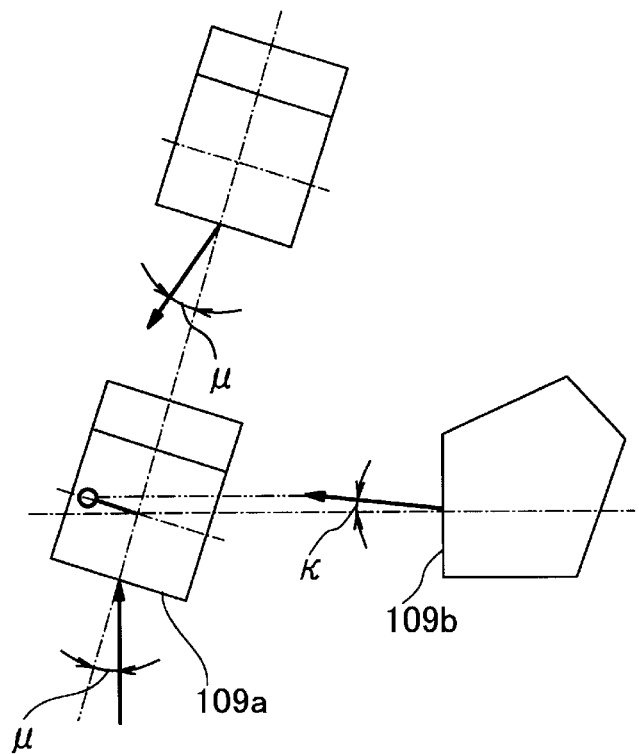
FIG. 16 illustrates three phases of light incident at some inclination angle upon the pentaprism, representing errors caused in resultant values of the determination of an elevation- or depression-angle.

Now, referring to FIG. 16, correction of errors caused in the elevation- or depression-angle will be described. Herein, the inclination □ of the optical axis relative to the entrance face 109a, and the directions of the X-, Y-, and Z-axes are all the same as those in FIG. 15. FIG. 16 illustrates three phases of the pentaprism 109. As stated above, when the incident light inclines at the angle □ in the XZ plane, the light exit at a deviation angle □ in the XY plane. At the same time, the light exit the prism in the YZ plane at a deviation angle κ as given by the equation (8) as follows:

$$\kappa = \sin^{-1}\left(\frac{\sin^2\mu}{\cos 2\mu}\right) \quad (8)$$

Subtracting the deviation angle □ from the elevation- or depression-angle γ permits the determined value of γ to be corrected. Correction of the elevation- or depression-angle γ can be carried out by transmitting a value of the deviation angle □ from the rotary laser apparatus 151 to the light sensor 154 and then using the light sensor 154 to subtract the deviation angle □ from the determined elevation- or depression-angle γ. Alternatively, the value of the angle □ may be first transmitted from the light sensor 154, and thereafter, the arithmetic operation as in the equation (8) may be carried out by the arithmetic operation unit 166 in the light sensor 155, so as to correct the elevation- or depression-angle γ.

(1.2.5.3) Correction of Errors Caused in Time Delays among Detections

Figure 17:
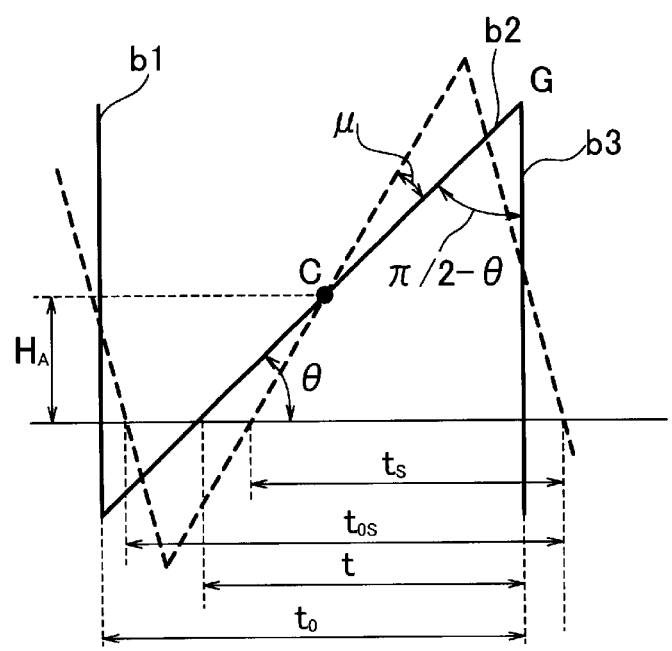
FIG. 17 illustrates errors being caused at time delays among detections of the diverging laser beams, with three of the diverging laser beams being emitted with some inclination as a whole.

When the rotary unit 105 is inclined, the diverging laser beams b1, b2, b3 are also inclined as a whole, retaining their relative positional relations to one another. Such an inclination also causes errors in time delays among the detections of the diverging laser beams b1, b2, b3. With reference to FIG. 17, the errors in the time delays among the detections of the incident beams will be explained. A thick solid line in FIG. 17 depicts the diverging laser beams b1, b2, b3 when the rotary unit 105 is not inclined, while a thick broken line represents the diverging laser beams b1, b2, b3 when the rotary unit 105 is inclined at the angle □ about the beam emission point C. As will be recognized in FIG. 17, without any inclination of the diverging laser beams, if the light sensor 154 is located a distance $H_A$ vertically right below the beam emission point C, the time delay between the detections of the diverging laser beams b3 and b2 is t while that between the detections of the diverging laser beams b3 and b1 is $t_0$. In contrast, with the inclination of the diverging laser beams at the angle □, even if the light sensor 154 is located at the same level as the point C, the time delay between the detections of the diverging beams b3 and b2 is $t_s$ while the time delay between the detections of the beams b3 and b1 is $t_{0s}$. A variation in the dime delay among the detections of the beams causes errors in a resultant value of the determined elevation- or depression-angle γ.

The true time delay t between the detections of the diverging laser beams b3 and b2 can be obtained on the inclination angle □ and the time delay $t_s$ with the rotary unit 105 being inclined at the angle □, by applying the equation (9) as follows:

$$t = \frac{\sin(\theta+\mu)\cos\mu}{\sin\theta}t_s + L_b\cos\theta\left(1 - \frac{\sin(\theta+\mu)}{\sin\theta}\right) \quad (9)$$

where $L_b$=CG. Also, the true time delay t0 between the detections of the diverging laser beams b3 and b1 can be obtained on the inclination angle □ and the time delay t0s with the rotary unit being inclined at the angle □, by applying the equation (10) as follows:

$$t_0 = t_{0s}\sin\left(\frac{\pi}{2} - \mu\right) \quad (10)$$

The deviation angle or the inclination angle □ determined by the deviation detecting device 190 is transmitted from the rotary laser apparatus 151 to the light sensor 154, and the arithmetic operations based upon the equations (9) and (10)

by the operation unit 166 in the light sensor 154 permit the time delays $t_s$ and $t_{0s}$ among the detections of the diverging laser beams to be corrected.

(1.3) Operation of Position Determining System

A first embodiment of the position determining system according to the present invention, incorporated with the deviation detecting device 190, can be used for operations of determining a position of the light sensor 154 relative to the rotary laser apparatuses 151 and 152 and producing a plane or a curved plane predetermined and input in the light sensor 154.

(1.3.1) Settings of Planes by Position Determining System

Figure 18:
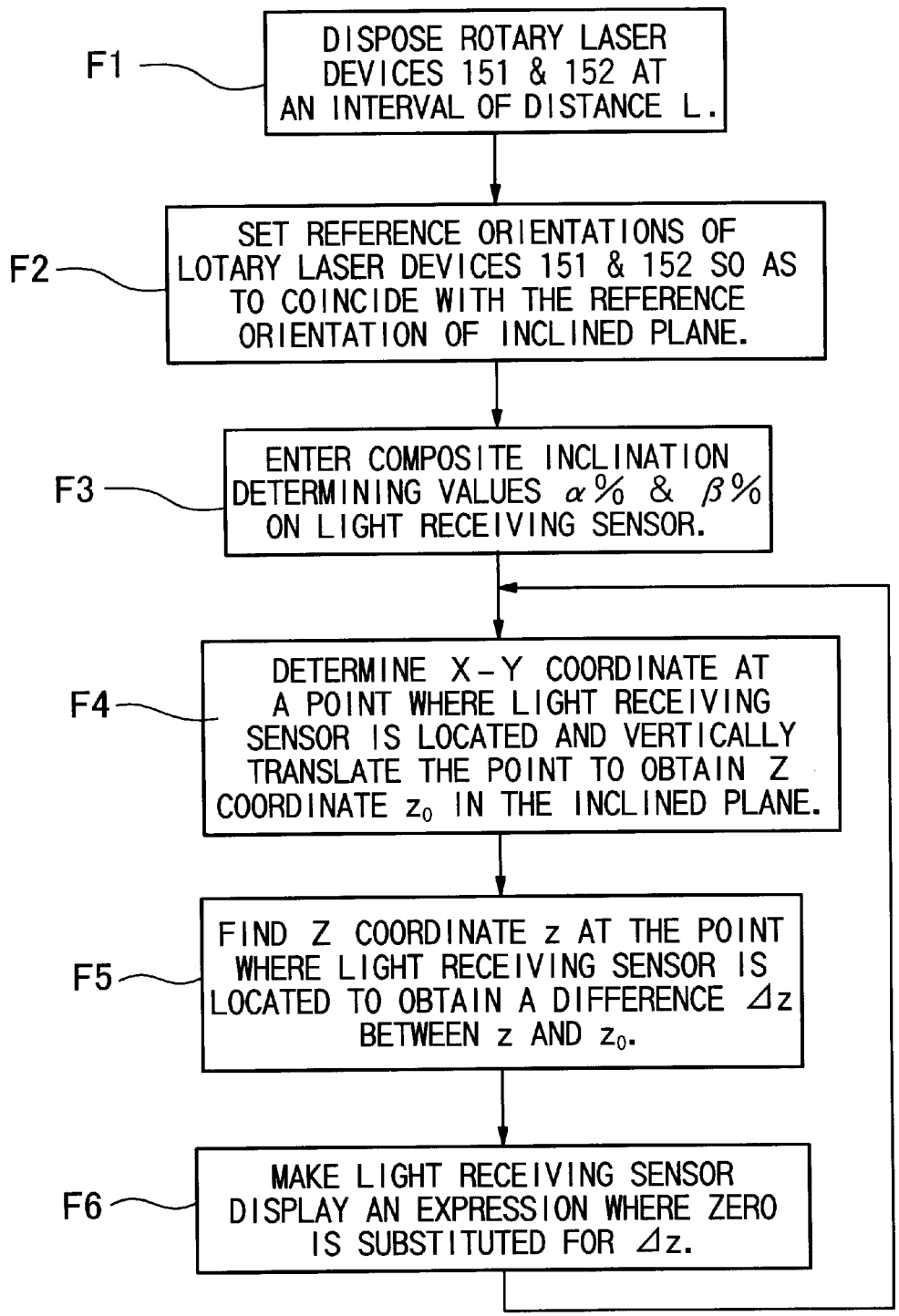
FIG. 18 is a flow chart illustrating operation procedures in producing a phantom plane with the position determining system.
Figure 19:
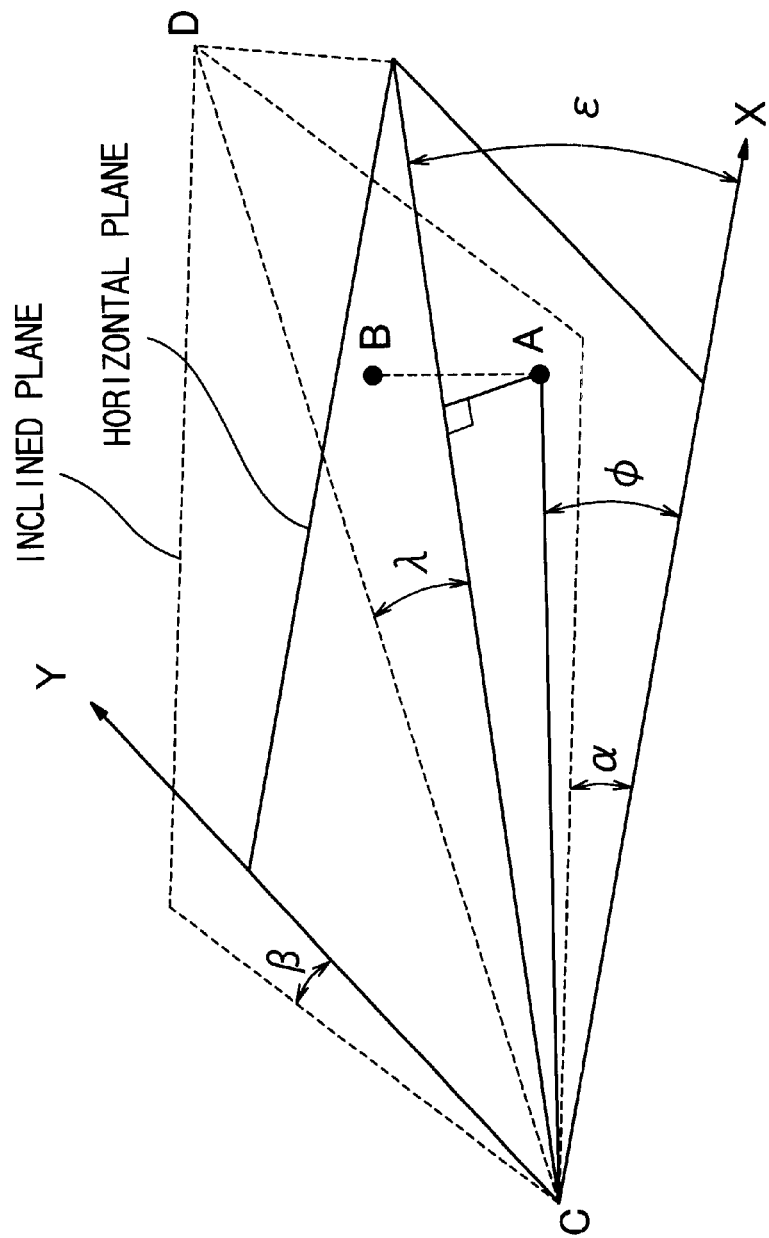
FIG. 19 is a perspective view showing a position relation of the desired phantom plane and the horizontal plane.

FIG. 18 is a flow chart illustrating a stepwise operation procedure of producing a phantom plane such as an inclined plane by means of the position determining system. FIG. 19 is a diagram showing a positional relation among the horizontal plane, the desired inclined plane, and the coordinate axes. In this embodiment, a case will be explained where an inclined plane (dual-axis inclination plane) is created, crossing the reference point or the point C, meeting the X-axis at an angle $\alpha$, and meeting the Y-axis at an angle $\beta$. The inclined plane is, when measured in relation with any point along a section CD, maximized in inclination (tilt), and an inclination angle is designated as $\lambda$.

At Step F1, first the rotary laser apparatus 151 is positioned so that the diverging beams b1, b2, and b3 rotate about a vertical axis passing the point C. Then, the rotary laser apparatus 152 is placed on the X-axis the distance L away from the point C. Preferably, it is positioned precisely with a tolerance of the distance L of less than 1 mm. A direction of the X-axis is arbitrarily determined so as to coincide with a reference orientation of a desired plane which is to be created.

Then, at Step F2, the rotary laser apparatuses 151 and 152 are located, respectively, so that their respective reference orientations coincide with a reference orientation of the desired inclined plane (i.e., the direction of the X-axis in this case). The reference orientations of the rotary laser apparatuses 151 and 152 are directions in which the encoder 117 built in each of the rotary laser apparatuses emits diverging beam at an angle of zero degree. Such positioning can be carried out by means of any well-known appropriate apparatus including a collimating telescope. In this embodiment, the encoder 117 attached to the rotary laser apparatus 151, while emitting the diverging laser beam b2 toward the rotary laser apparatus 152, produces the power of zero and measures an angle with a norm where a counterclockwise direction is a positive direction; meanwhile the encoder 117 attached to the rotary laser apparatus 152, while emitting the diverging laser beam b2 toward the rotary laser apparatus 151, produces the power of zero and measures an angle with a norm where a clockwise direction is a positive direction.

At Step F3, entered on entry keys 162 of the light sensor 154 are the desired inclination angle $\alpha$ at the reference orientation of the desired inclined plane (i.e., in the direction of the X-axis) and the desired inclination angle $\beta$ orthogonal to the reference orientation (i.e., in the direction of the Y-axis). Values entered are stored in the memory 165 in the light sensor 154. The light sensor 154 may be configured so that the inclination angles $\alpha$ and $\beta$ can be entered in optional units such as radians (rad), degrees (deg), gradient (%), and the like. The reference point C and the input values of two of the inclination angles $\alpha$ and $\beta$ are sufficient to totally define the inclined plane that is to be created. In general, the inclination angle of the inclined plane varies depending upon which direction from the reference point C the measurement on the inclination angle is performed. When the inclination angle is measured in an arbitrary direction (e.g., in a direction defined by the X-axis and an angle $\phi$), an inclination angle $\gamma_0$ (elevation-angle or depression-angle) can be obtained from an equation (11) as follows:

$$\gamma_0 = \tan^{-1}(\tan \lambda \cos(\phi - \epsilon)) \qquad (11)$$

where $\lambda = \sqrt{\alpha^2 + \beta^2}$ is satisfied, and
when $\alpha > 0$ and $\beta \geq 0$, $\epsilon = \tan^{-1}(\beta/\alpha)$;
when $\alpha = 0$ and $\beta > 0$, $\epsilon = \pi/2$;
when $\alpha < 0$ and $\beta \geq 0$, $\epsilon = \tan^{-1}(\beta/\alpha) + \pi$;
when $\alpha < 0$ and $\beta \leq 0$, $\epsilon = -\tan^{-1}(\beta/\alpha) - \pi$;
when $\alpha = 0$ and $\beta < 0$, $\epsilon = -\pi/2$; and
when $\alpha > 0$ and $\beta \leq 0$, $\epsilon = \tan^{-1}(\beta/\alpha)$.

The distance L between the rotary laser apparatuses 151 and 152 that have been determined in advance is also entered on the entry keys 162 and stored in the memory 165.

At Step F4, the light receiving unit 155 of the light sensor 154 receives the laser beam S emitted from the rotary laser apparatus 151. The operational unit 166 in the light sensor 154 uses an optical signal carried in the received laser beam to arithmetically compute the rotational angular position $\zeta$ representing where the light sensor 154 is currently located relative to the reference point C. Furthermore, the deviation signal receiver 170 of the light sensor 154 receives a signal carrying a deviation angle that is transmitted from the transmitter 123 of the rotary laser apparatus 151, and thereafter, the rotational angular position □ is corrected by applying the equation (7). Moreover, a similar arithmetic operation is performed with the laser beam S emitted from the rotary laser apparatus 152, so as to obtain the rotational angular position □. Two of the rotary laser apparatuses 151 and 152 are synchronized with each other so that they can revolve the laser beams S, respectively, at the same revolving rate, and that they can emit the laser beams S, respectively, in directions parallel with each other. In this way, the laser beams S respectively emitted from the rotary laser apparatus 151 and 152 fall on the light sensor 154 simultaneous with each other. As mentioned above, the rotary laser apparatuses 151 and 152 respectively emit the laser beams S modulated different from each other, and this enables the light sensor 154 to easily distinguish two of the laser beams one from the other.

The operational unit 166 uses the resultantly obtained rotational angular positions $\zeta$ and $\xi$, and the distance L between two of the rotary laser apparatuses and applies the equation (4) to arithmetically obtain the distance m between the rotary laser apparatus 151 and the light sensor 154 and the distance n between the rotary laser apparatus 152 and the light sensor 154. After that, the operational unit 166 uses the equation (5) to obtain the X- and Y-coordinates of the light sensor 154 in relation with the origin of the point C.

The operational unit 166 of the light sensor 154 arithmetically computes an inclination angle $\gamma_0$ of the inclined plane that is measured in the direction coincident with the measured rotational angular position. When the light sensor 154 is located in a point A which lies along an extension from the reference point C at the angle $\phi$ (note that the point A lies in the horizontal plane), the inclination angle $\gamma_0$ of the inclined plane, which is measured in the direction defined by the angle $\phi$, is equal to an angle $\angle BCA$ at which a straight line crossing both a point B in the inclined plane vertically right above the point A and the reference point C meets the horizontal plane, and the inclination angle $\gamma_0$, can be arithmetically computed from the equation (3). The operational unit 166 uses the inclination angle $\gamma_0$ and the distance m and further applies the equation (6) to obtain a distance between the point A and the point B, namely, Z-coordinate $z_0$.

At Step F5, the operational unit 166 in the light sensor 154 uses the delays t and $t_0$ between the detections of two of those three diverging beams b1, b2, and b3 emitted from the rotary laser apparatus 151 and further applies the equation (2) to arithmetically compute the elevation-angle or depression-angle γ in the position where the light sensor 154 currently lies and indicate the resultant value in the display 157. In computing the elevation-angle or depression-angle γ, the deviation angle ☐ obtained from the equation (8) is used along with applications of the equations (9) and (10) to correct the value of the elevation- or depression-angle γ. Moreover, the Z-coordinate z of the light sensor 154 is computed based upon the equation (6) with the elevation-angle or depression angle γ and the distance m to display the resultant value in the display 157. The rotational angular position ζ of the light sensor 154 is also indicated in the display 157. Then, the elevation-angle or the depression-angle denoted by z and the inclination angle denoted by $z_0$ are compared with each other to obtain a difference Δz between them.

At Step F6, from Δz obtained at Step F5, it is determined which way, upward or downward, the light sensor 154 must be shifted to permit it to come close to the desired inclined plane, and the determination result is indicated in the display 157. An operator displaces the light sensor 154 upward or downward depending upon the indication in the display 157. A displacement of the light sensor 154 can be read on the index 163 and the scale rod 159 provided in the light sensor. The displacement may instead be read by the scale reader 167 and a value read out may be sent to the operational unit 166.

The stepwise procedure from Step F4 to Step F6 are automatically repeated till the light sensor 154 is placed in the desired inclined plane that is to be created. Preferably, when located in the desired inclined plane, the light sensor 154 allows its buzzer 161 to buzz.

As desired, it may also be preferable that the inclined plane is automatically determined with a straight line crossing both the reference point C and the arbitrarily located light sensor 154 being inclined at the maximized gradient. Specifically, as in FIG. 19, the rotary laser apparatus 151 is located in the reference point C while the rotary laser apparatus 152 is positioned the distance L away from the rotary laser apparatus 151. Then, the light sensor 154 is placed in an arbitrary point D. After that, the rotary laser apparatus 151 and 152 are actuated to determine X-Y-Z coordinate at the point D. The operational unit 166 in the light sensor 154 computes the inclination angle α in a direction (i.e., the X-axis direction) along which both the rotary laser apparatuses 151 and 152 lie in a straight line that defines a plane that is inclined at the maximized inclination angle defined by a section CD and, the operational unit also computes the inclination angle β in a direction of the Y-axis orthogonal to the X-axis. The resultant inclination angles α and β are indicated in the display 157 of the light sensor 154, and thus, the inclination plane defined by the inclination angles α and β is determined. In this way, the inclined plane thus determined can be produced in an arbitrary location. Alternatively, it may also be preferable that the buzzer buzzes when the light sensor 154 is placed in the desired inclined plane.

Further alternatively, three arbitrary points may be specified as desired so that an inclined plane can be determined, crossing all the three points at a time in conjunction with the light sensor 154.

Although one embodiment has been described in the context of determination of an inclined plane, the position determining system according to the present invention may be adapted to determine a surface of any shape such as a curved surface. In such a case, the light sensor may be configured so as to key-enter Z-coordinate thereon in relation with X-Y coordinate of the surface that is to be created. A difference is arithmetically computed between a height of the desired surface and a height at which the light sensor lies, so as to give an indication to guide the operator to set the light sensor in the desired surface that is to be created, similar to the above-mentioned embodiment.

(1.3.2) Position Measurement by Position Determining System

The above-mentioned operation employs a manner in which the operator predetermines an inclined plane as desired and then uses the position determining system of the present invention to produce the inclined plane. On the contrary, an alternative operation described hereinafter employs a manner in which the position determining system of the present invention is used to determine coordinates at an arbitrary point at which the light sensor 154 is located. Thus, the rotary laser apparatus 151 is located in the reference point C, the rotary laser apparatus 152 is positioned the distance L away from the rotary laser apparatus 151, and the light sensor 154 is placed in a point of which coordinate is to be found. After that, the rotary laser apparatuses 151 and 152 are actuated to emit the diverging laser beams b1, b2, and b3. Based upon the diverging beams incident upon the light sensor 154, the light sensor 154 determines three-dimensional coordinate at a point where it lies to display the coordinate thereon. Procedures such as an arithmetic computation of the three-dimensional coordinate of the position where the light sensor 154 lies are totally the same as those in the aforementioned case of position determination. Although the aforementioned embodiment defines the origin of the three-dimensional coordinate as the rotation center of the rotary laser apparatus 151 or the point C, it may also be preferable that any point can be the origin to indicate the coordinate at the position where the light sensor 154 is. For example, at the beginning of the measurement, the light sensor 154 is located in a desired position to determine the three-dimensional coordinate thereof. In succeeding measurement, the light sensor 154 may be configured to indicate the coordinate with the position where the light sensor 154 has originally been positioned being defined as the origin.

In the above-mentioned embodiment, a plurality of the light sensors 154 can be combined with each of the rotary laser apparatuses 151 and 152 so as to independently use each of the light sensors 154. Moreover, when the prior art embodiment is used, two of the inclined plane determining systems are required to produce two inclined planes varied from each other, and laser beams emitted from the rotary laser apparatus in each system interfere with each other to cause a problem of malfunctions. On the other hand, in the embodiments of the position determining system according to the present invention, simultaneously a plurality of light sensors 154 can be used in relation with a single pair of the rotary laser apparatuses 151 and 152, and additionally, varied inclined planes can be produced from one light sensor 154 to the other and/or varied three-dimensional coordinates can be measured from one light sensor 154 to the other.

In this way, for instance, when the light sensor 154 is attached to construction equipment for the purpose of land grading, a plurality of construction machines can be simultaneously in use in relation with a single pair of the rotary laser apparatuses 151 and 152, and lands of varied inclination planes can accordingly be leveled by varied construction machines. When the desired inclined plane is varied from one another, settings on the inclined plane can be changed for each of the light sensor, and hence, the rotary laser apparatuses in relation with the sensor do not have to be interrupted, which, on the other hand, eliminates a necessity of interrupting the activated light sensors with which there is no need of change in settings.

(1.3.3) Alternative Operation Manner of Position Determining System

An alternative operation manner of the position determining system will now be described. Hereinafter, an available substitutional procedure will be given as to the Step F2 in FIG. 18, namely, a procedure of conforming the reference orientations of the rotary laser apparatuses 151 and 152 to the reference direction of the inclined plane.

Figure 20:
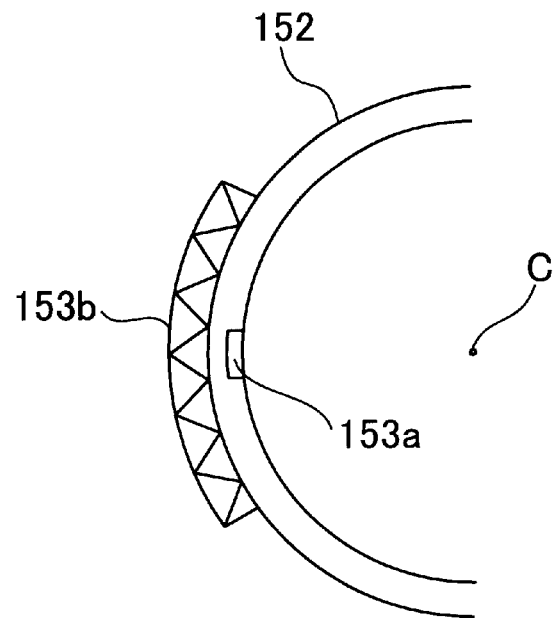
FIG. 20 is a partially enlarged view showing a light receiving means and a light reflector means both of which are incorporated in the rotary laser apparatus.

As shown in FIG. 20, a light receiving means 153a and a reflecting means 153b are incorporated in each of the rotary laser apparatuses 151 and 152. The diverging laser beams emitted from the rotary laser apparatus 151 are reflected by the reflecting means 153b in the rotary laser apparatus 152, and the encoder 117 measures a rotational angular position of the rotary laser apparatus 151 at an instant when the reflected beams from the reflecting means fall on the light receiving means 153a in the rotary laser apparatus 151. Converting data on the rotational angular position thus obtained so that the rotation angular position satisfies $\zeta=0$, the rotational angular position can be obtained under a condition where the reference direction of the inclined plane is zero. A similar conversion operation is performed with a deviation angle detected by the deviation detecting device 190. A similar procedure is performed as with the rotary laser apparatus 152, and resultantly, a desired rotation angular position can be found under a condition where the reference orientation is zero.

Figure 21:
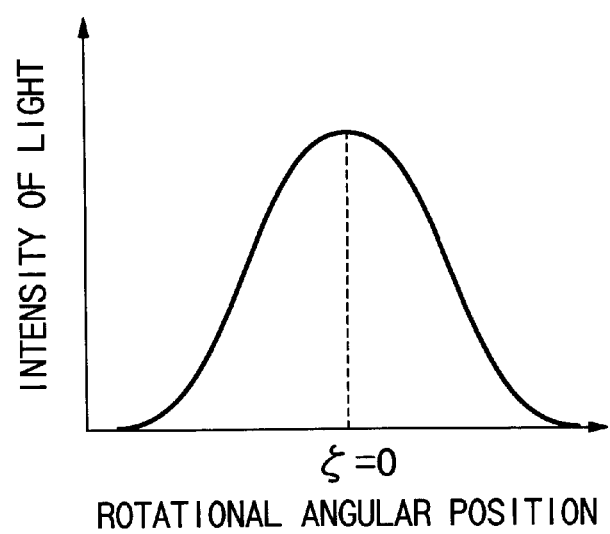
FIG. 21 is a graph representing a relation of an intensity of light incident upon the light receiving means in the rotary laser apparatus with a rotational angular position at which the laser beam is emitted.

Preferably, the reflecting means 153b incorporated in each of the rotary laser apparatuses is configured as in a module of FIG. 20 where tape that has micro prisms in corner-cube shapes deployed in line is attached along a circumference concentric with the rotary laser apparatus. The diverging laser beams emitted from the rotary laser apparatus 151 are reflected by the reflecting means 153b attached to the rotary laser apparatus 152, and the reflected beams are received by the light receiving means 153a incorporated in the rotary laser apparatus 151. At this time, intensity of the light incident upon the light receiving means 153a varies depending upon the rotational angular position at which the diverging beam is emitted, as can be seen in FIG. 21. The rotary laser apparatus 152 is regarded as being disposed in a rotational angular position where the intensity of the light incident upon the light receiving means 153a in the rotary laser apparatus 151 is maximized. The rotary laser apparatus 151 is adapted to produce a signal carrying the rotational angular position satisfying $\zeta=0$ at which the intensity of the light incident upon the light receiving means 153a is maximized. Alternatively, a light emitting means (not shown) may be otherwise incorporated in the rotary laser apparatus 151, and when the intensity of the light incident upon the light receiving means 153a reaches the maximized level, the light emitting means (not shown) emits beam. The beam emitted from the light emitting means is received at the light sensor, and the light sensor detects the rotational angular position satisfying $\zeta=0$. A similar procedure is performed as with the rotary laser apparatus 152 to determine the rotational angular position meeting $\xi=0$.

In another embodiment of the Step F2, the rotary laser apparatuses 151 and 152 are arbitrarily oriented at an interval of the distance L between them. Then, the light sensor 154 is located in the same position as the rotary laser apparatus 152, and the light sensor 154 receives the laser beam S from the rotary laser apparatus 151. The rotational angular position determined by the light sensing operation can be utilized as an offset angle and subtracted from the measured rotation angular position to find the rotational angular position at which a direction of a reference line joining the rotary laser apparatuses 151 and 152 is defined by $\zeta=0$. Similarly, the light sensor 154 is placed in the position where the rotary laser apparatus 151 lies to receive the laser beam S from the rotary laser apparatus 152, and thus, an offset angle is determined. The offset angle is subtracted from the determined rotational angular position to find the rotational angular position at which the direction of the reference line is defined by $\xi=0$.

In another embodiment, each of the rotary laser apparatuses 151 and 152 is provided with a light receiving means and a light emitting means (not shown). When the light receiving means in the rotary laser apparatus 152 receives the diverging laser beam emitted from the rotary laser apparatus 151, the light emitting means (not shown) in the rotary laser apparatus 152 emits light from the entire circumference thereof. The light sensor 154 stores data on the rotational angular position transmitted from the rotary laser apparatus 151 at an instant of the beam reception. Then, the light sensor 154 stores data on the rotational angular position transmitted from the rotary laser apparatus 151 at an instant of the reception of the diverging laser beam from the rotary laser apparatus 151. Subtracting the data on the rotational angular signal upon the reception of light from the light emitting means (not shown) in the rotary laser apparatus 152 from the data on the rotational angular position upon the reception of the diverging laser beam, the rotational angular position at which the direction of the reference line is defined by $\zeta=0$ can be obtained. Similarly, functionally replacing the rotary laser apparatus 151 with the device 152 and vice versa, the rotational angular position at which the direction of the reference line is defined by $\xi=0$ can be obtained.

(2) Other Embodiments

Although the first preferred embodiment of the position determining system according to the present invention has been described, the rotary laser apparatuses and the light sensor incorporated in the position determining system can be implemented as explained hereinafter. Corresponding components to those of the first embodiment are denoted by similar reference numerals in which only two orders of digits are changed, and details of the similar components to those of the first embodiment are omitted.

Figure 22:
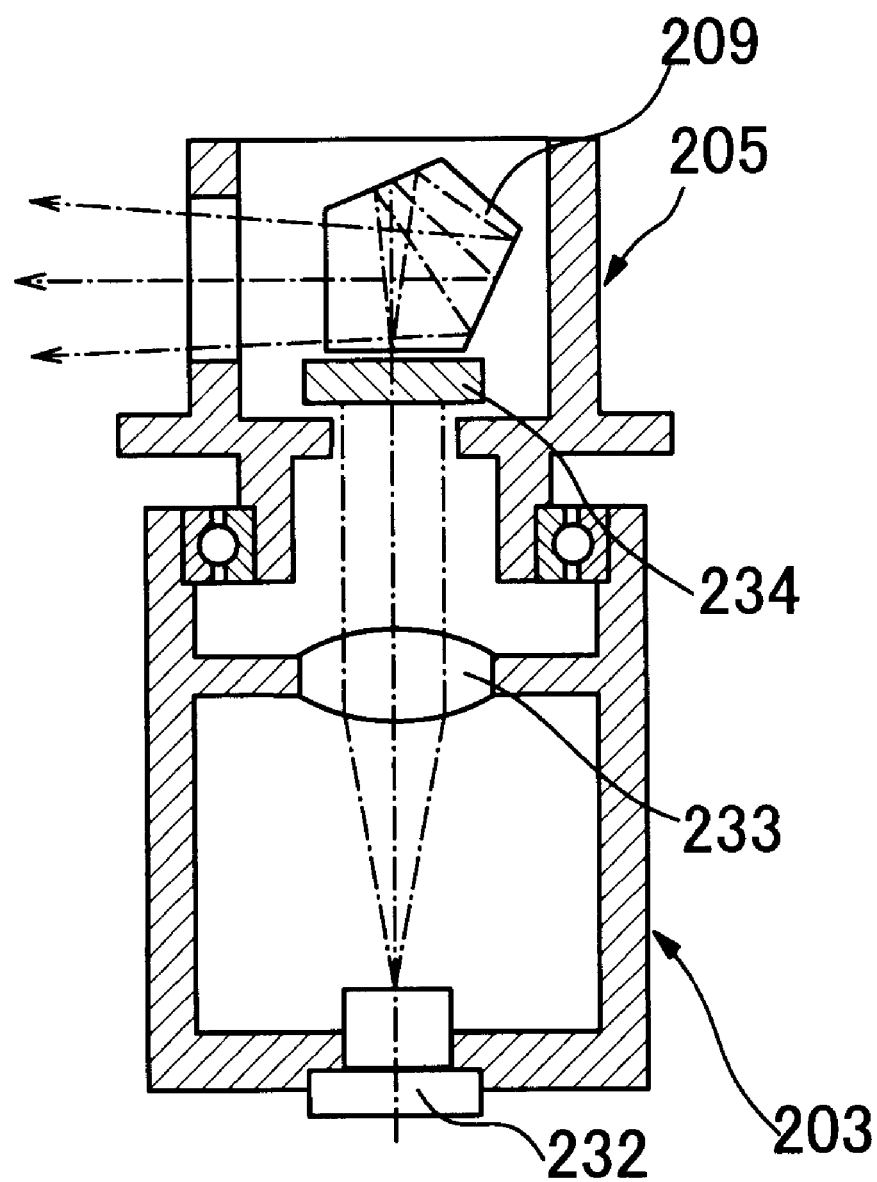
FIG. 22 is a sectional view showing another configuration of a light projector incorporated in the rotary laser apparatus.

(2.1) Alternative Embodiments of Rotary Laser Apparatuses (2.1.1) Rotary Laser Apparatus with Diffraction Grating Being Positioned under Pentaprism As illustrated in FIG. 22, a diffraction grating 234 of a laser projector 203 incorporated in the rotary laser apparatus may be positioned under a pentaprism 209. For simplification of the depictions in the drawing, optics emitting the laser beam S carrying the rotational angular position is omitted from FIG. 22.

(2. 1. 2) Rotary Laser Apparatus Emitting Diverging Laser Beams of Varied Polarizations from One Another With reference to FIG. 23, the laser projector that emits the diverging laser beams of varied polarizations from one another will now be described. This embodiment of the position determining system according to the present invention is adapted to find an elevation-angle or depression-angle $\gamma$ by applying the equation (2) with the time delay t between receptions of the diverging laser beams incident upon the light sensor. As can be seen in FIG. 24(a), when the time delay between receptions of the diverging laser beams incident upon the light sensor is relatively long, it is possible to obtain the time delay t accurately. However, as in FIGS. 24(b) and 24(c), as the time delay t becomes shorter, it is hard to distinguish two of the incident diverging laser beams from one another, and accordingly, it becomes difficult to determine the time delay t between receptions of those two diverging laser beams. Thus, the diverging laser beams are deflected different from one another so that the diverging laser beams can be easily distinguished from one another.

Figure 23:
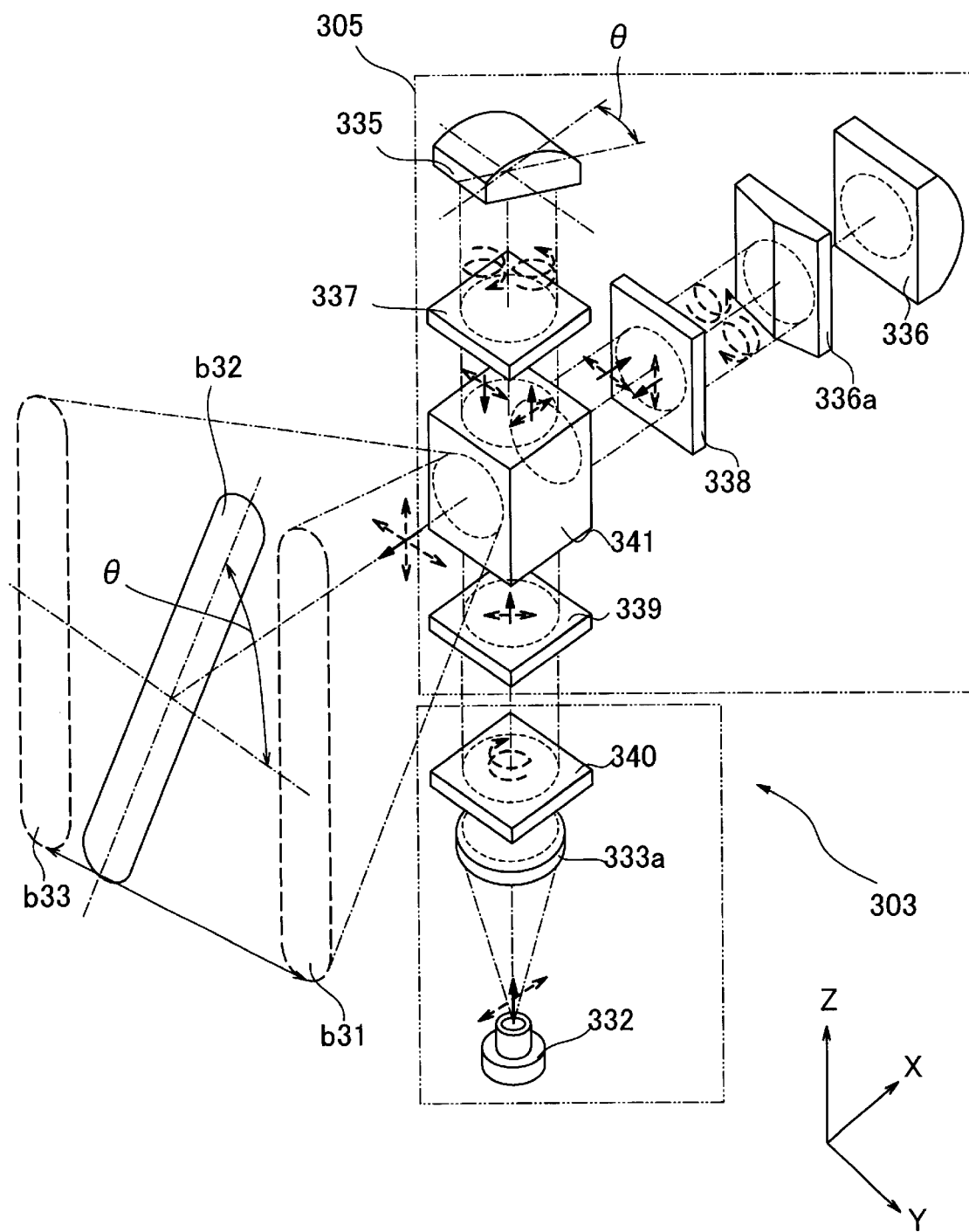
FIG. 23 is a perspective view showing a configuration of a light projector that emits the diverging laser beams of varied deflection from one another.
Figure 24:
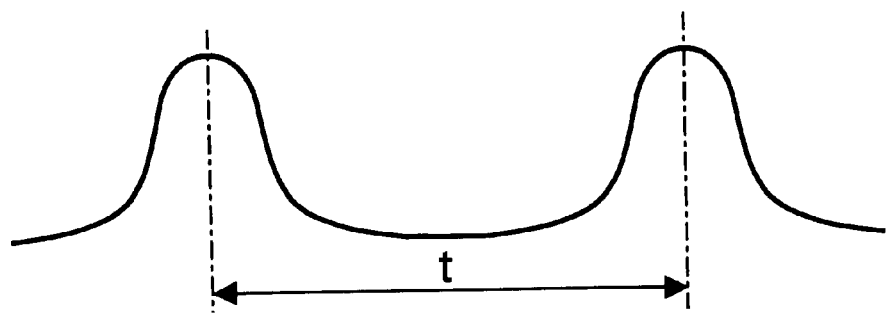
FIG. 24 is a graph representing the diverging laser beams incident upon a light sensor.
Figure 24:
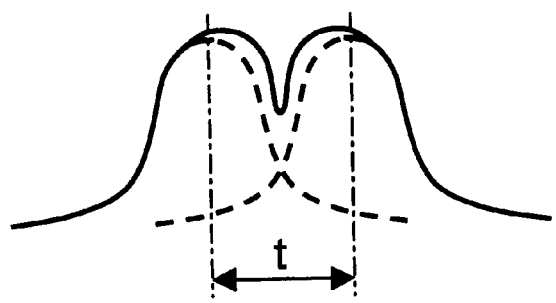
Figure 24:
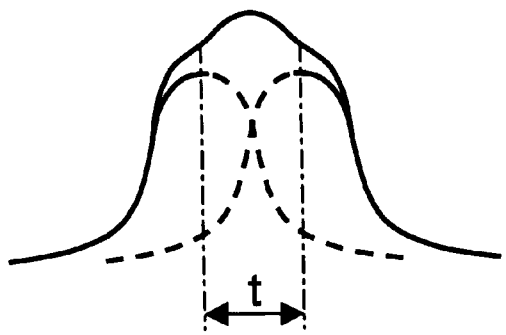

FIG. 23 depicts optics of a laser projector 303 that emits three diverging laser beams b31, b32, and b33 of varied polarizations from one another. Typically, directions of the laser beams passing optical components in the drawing are denoted by solid arrows while deflection directions of the laser beams are denoted by broken arrows.

When laser diode is used for laser beam projector 332 incorporated in the laser projector 303, resultant laser beam assumes linear polarization. Hereinafter, it is assumed that the laser beam is deflected in an X-direction, the laser beam is emitted in a Z-direction, and a direction orthogonal to an X-Z plane is a Y-direction. The laser beam emitted from the laser beam projector 332 is collimated by a collimator lens 333 and falls upon a one-quarter (¼) wave plate 340. The one-quarter wave plate 340 is oriented so that the laser beam emitted from the laser beam projector 332 and then linear polarized in the X-direction turns to circular polarization. The laser beam, after passing the one-quarter wave plate 340, is transmitted through another one-quarter wave plate 339 again, and then, it is linear polarized in a direction meeting an axis in the X-direction at an angle of 45°, as shown in FIG. 23. Since a rotary unit 305 is rotatably supported, a relative position of the one-quarter wave plate 340 to the one-quarter wave plate 339 is varied. However, the laser beam after being passed through the one-quarter wave plate assumes circular polarization, and hence, a deflection direction of the linear polarization after passing the one-quarter wave plate 339 again is not affected by a variation in the relative position of the wave plate but is determined by the one-quarter wave plate 339. The laser beam passes the polarized beam splitter 341. The polarized beam splitter 341 reflects polarization components in the Y-direction while transmitting polarization components in the X-direction. Thus, the Y-direction components of the laser beam that are linearly polarized in a direction meeting an axis in the X-direction at an angle of 45° by the one-quarter wave plate 339 are reflected by the polarized beam splitter 341 and deflected by 90°. The X-direction components of the laser beam are passed through the polarized beam splitter 341.

The laser beam reflected by the polarized beam splitter 341 falls upon the one-quarter wave plate 338 again to turn to circular polarization, and then it is reflected by a cylinder mirror 336. The cylinder mirror 336 is oriented so that the laser beam, when emitted from the rotary unit 305, is advanced orthogonal to a horizontal plane. A declination prism 336a is placed between the one-quarter wave plate 338 and the cylinder mirror 336. The declination prism 336a is bisected at its center, and it assumes a transmission declination by which the diverging beams b31 and b32, when emitted from the rotary unit 305, meet at an angle of 2δ. Since the laser beam reflected by the cylinder mirror 336 is transmitted through the declination prism 336a and the one-quarter wave plate 338 again and then linearly polarized in the Z-direction, the laser beam then can be transmitted through the polarized beam splitter 341 and then exits from the rotary unit 305.

On the other hand, the laser beam transmitted through the polarized beam splitter 341 falls upon the one-quarter wave plate 337 to turn to circular polarization, and thereafter, it is reflected by the cylinder mirror 335. The cylinder mirror 335 is oriented so that the diverging laser beam b32, when exiting from the rotary unit 305, meets the horizontal plane at an angle of θ. Since the laser beam reflected by the cylinder mirror 335 is transmitted through the one-quarter wave plate 337 again and then linearly polarized in the Y-direction, the laser beam then can be reflected by the polarized beam splitter 341 that has transmitted it in the earlier stage, and it exits from the rotary unit 305.

When the rotary laser apparatus emitting the diverging beams of varied polarizations from one another is used, optics is added to the light sensor so as to separate the diverging beams of varied polarizations. Specifically, the light receiving unit 156 of the light sensor 154 is provided with a beam splitter (not shown) that is used to separate the laser beams of varied polarizations. A light receiving element (not shown) that receives the laser beam transmitted through the beam splitter (not shown), and a light receiving element (not shown) that receives the laser beam reflected by the beam splitter (not shown) are separately provided. In such a configuration, two diverging laser beams of varied polarizations from each other, even if falling upon the light receiving elements (not shown) one after another at short time intervals, are received at the separate light receiving elements, and hence, the time delay t between receptions of the beams can be accurately determined.

Figure 25:
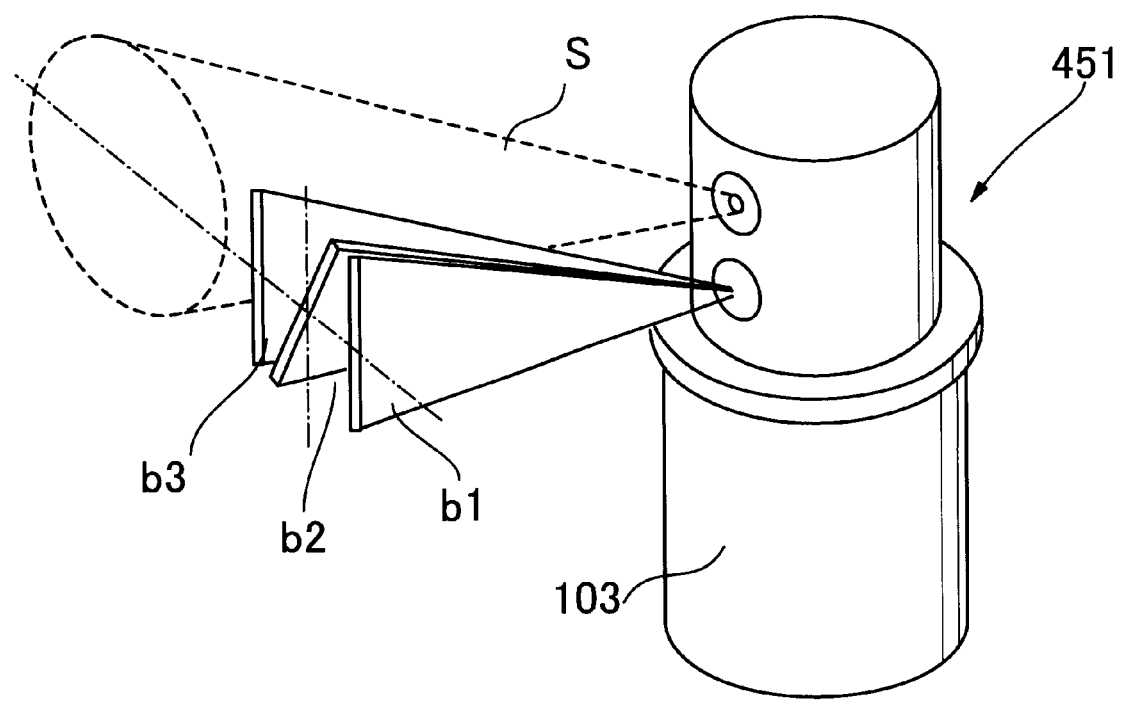
FIG. 25 is a perspective view showing the rotary laser apparatus that emits three of the diverging laser beams and the laser beam carrying an angular signal in different directions, respectively.

(2.1.3) Rotary Laser Apparatus Emitting Diverging Laser beams and Laser beam Carrying Angular signal in Varied Directions from One Another The three diverging beams and the laser beam S carrying an angular signal do not have to necessarily be emitted in the same direction. Specifically, as shown in FIG. 25, the rotary laser apparatus 451 may be adapted to emit the diverging beams b1, b2, and b3 and the laser beams S carrying an angular signal in varied directions from one another so that those beams would not interfere with one another. In such a case, a time delay between the time when the diverging beam b2 is received and the time when the laser beam S is received is used to compute an angle. In this configuration, laser light developed from the diverging beams b1, b2, and b3 and that from the laser beam S carrying an angular signal may be identical in color (wavelength), and a single light receiving unit provided in the light sensor may be shared between use for the diverging beams and use in receiving an angular signal. Additionally, it is necessary that the laser beam carrying an angular signal have an angular divergence that can cover the entire range where position measurement can be carried out by utilizing the diverging beams b1, b2, and b3.

(2.1.4) Rotary Laser Apparatus Emitting Two Diverging Laser Beams

Figure 26:
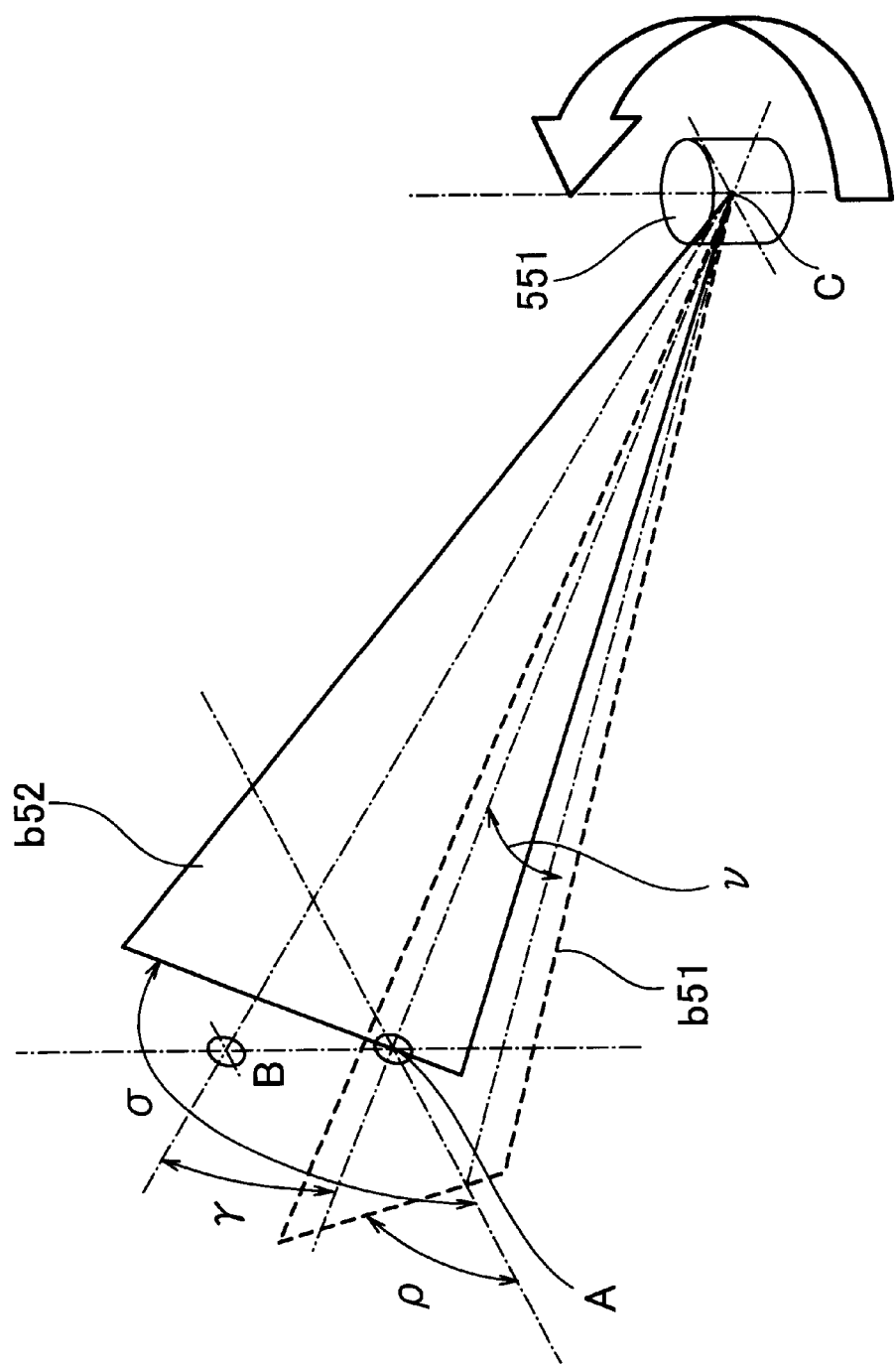
FIG. 26 is a perspective view showing the rotary laser apparatus emitting two of the diverging laser beams.

Referring to FIG. 26, a rotary laser apparatus 551 emitting two diverging laser beams b51 and b52 will now be described. As shown in FIG. 26, the rotary laser apparatus 551 rotates about the point C while emitting the diverging laser beams b51 and b52.

Figure 27:
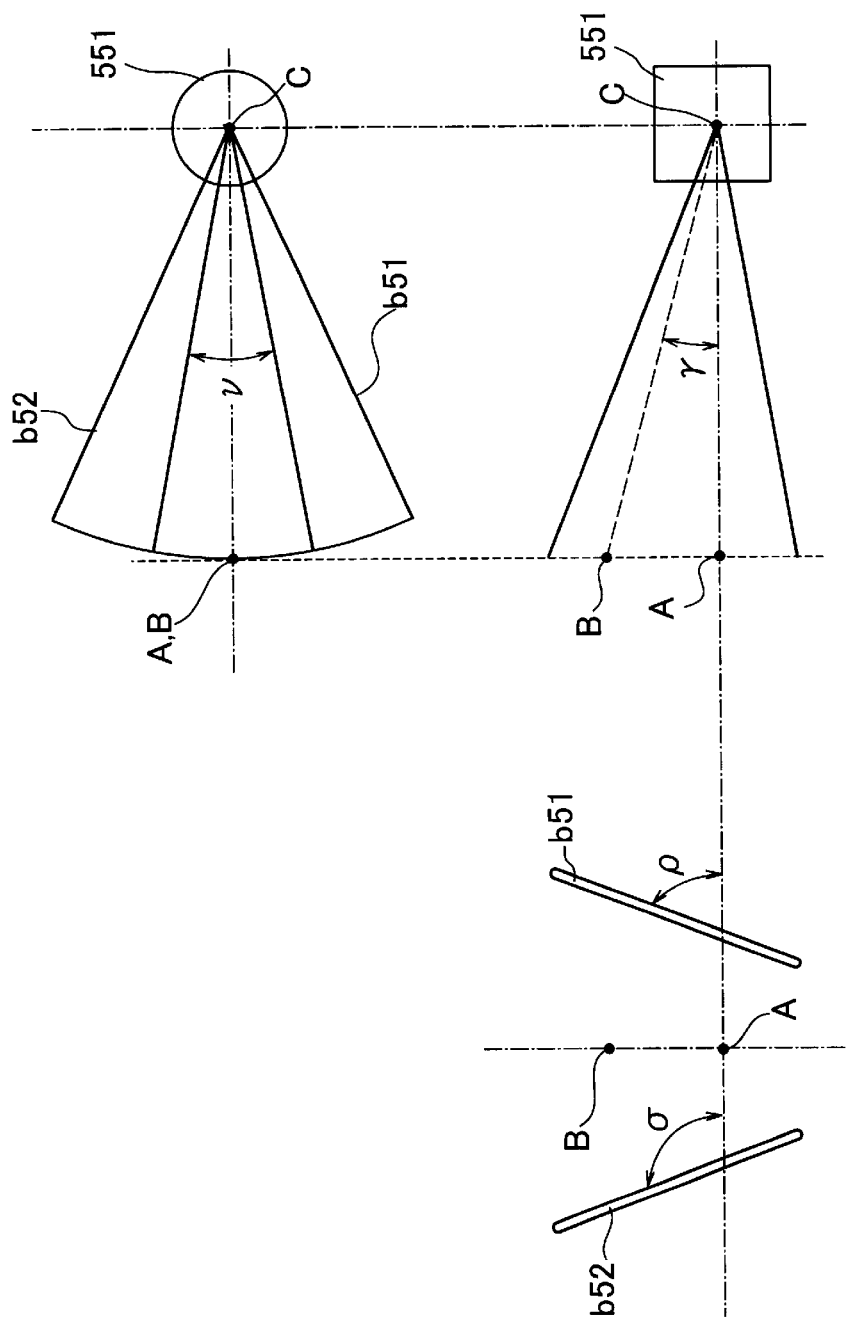
FIG. 27 illustrates three phases of an arrangement of the two diverging laser beams.

As shown in FIG. 27, the diverging laser beam b51 is emitted, meeting the horizontal plane at an angle ρ while the diverging laser beam b52 is emitted, meeting the horizontal plane at an angle σ. It is additionally assumed that a cross line of the diverging laser beam b51 with the horizontal plane meets a cross line of the diverging laser beam b52 with the horizontal plane at an angle ν. Since two of the diverging laser beams b51 and b52 are rotated, keeping the above-stated conditions, respectively, the diverging laser beams b51 and b52 pass the light sensor one after another with some time difference. In this embodiment, the time difference is utilized to determine a height of the light sensor elevated or depressed from the horizontal plane.

Figure 28:
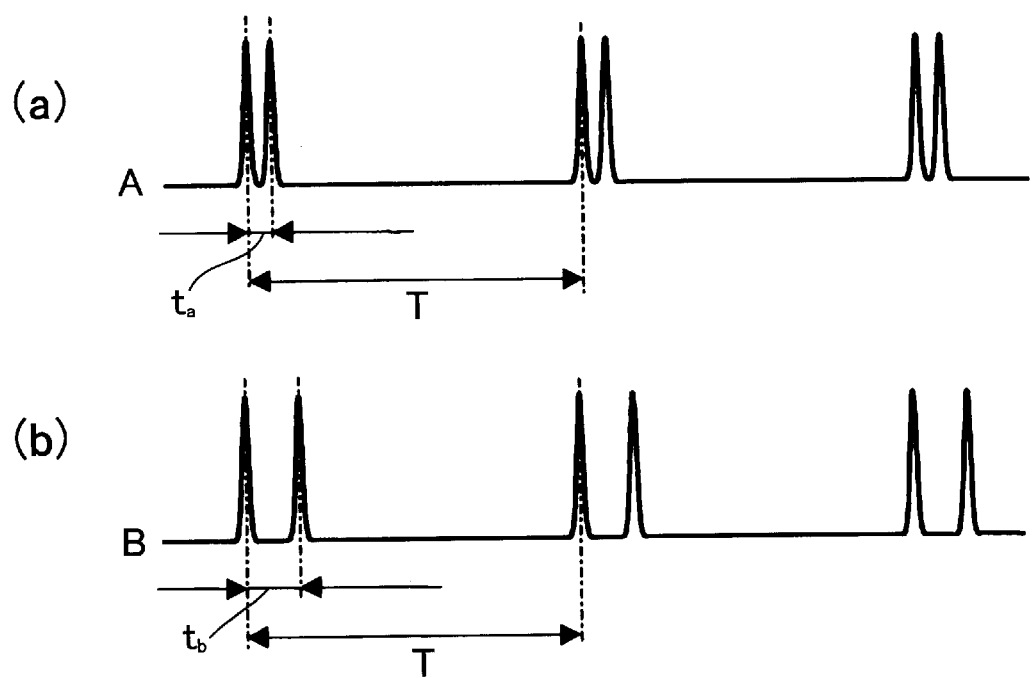
FIG. 28 is a graph representing the diverging laser beams incident upon the light sensor.

Referring now to FIG. 28, a principle of measuring an elevation-angle or depression-angle γ in relation with this embodiment will be described. As mentioned above, the diverging laser beams b51 and b52 pass a light receiving unit in the light sensor 154 one after another with a time delay. When the light receiving unit of the light sensor 154 lies in a position A in the horizontal plane, the light sensor 154 detects laser beam as depicted in FIG. 28(a). When the light receiving unit lies in a position B vertically right above the position A, detected diverging beam is as depicted in FIG. 28(b). As will be recognized in FIG. 28(a), assuming that the time delay between detections of two of the diverging beams is $t_a$ when the light receiving unit lies in the position A and that a revolving cycle of the rotary laser apparatus 551 is T, the time delay between detections of two of the beams can be expressed as in the following equation (12):

$$t_a = T\frac{\delta}{2\pi} \quad (12)$$

When the light receiving unit lies at an arbitrary level B, the time delay $t_b$ between detections of the beams is in proportion to an angle at which a straight line crossing both the position B of the light receiving unit and the emission point C of the diverging laser beams meets the horizontal plane, namely, it is in proportion with an elevation-angle or depression-angle ∠ BCA=γ, and hence, the time delay $t_b$ between detections of the beams becomes longer as a value of γ is greater. Thus, determining the time delay $t_b$ in relation with the position B, the following equations (13) and (14) can apply to find the angle:

$$\gamma = \frac{t_b - t_a}{T\left(\frac{1}{2\pi\tan(\pi - \sigma)} + \frac{1}{2\pi\tan(\rho)}\right)} \quad (13)$$

$$\gamma = \frac{(t_b - t_a)\pi\tan(\rho)}{T} \quad (14)$$

(especially, when $\pi - \sigma = \rho$ is satisfied)

An arithmetic operation where the time delay $t_b$ between passages of two of the diverging laser beams b51 and b52 through the light receiving unit of the light sensor 154 and the rotation cycle T of the rotary laser apparatus 551 are used to obtain the angle γ is carried out by a light reception determining unit 166 built in the light sensor 154, and the angle γ that can be obtained in such a way is indicated in the display 157. The resultant angle γ is substituted for a term in the equation (6) to obtain Z-coordinate of the light sensor 154. Determinations of X-coordinate and Y-coordinate are the same as in the principle of measurement explained in the context of the first embodiment mentioned above. A desired elevation-angle or depression-angle $\gamma_0$ is entered in the light sensor in advance, and a time delay $t_b-t_a$ between receptions of the beams corresponding to the elevation-angle or depression-angle $\gamma_0$ is obtained. The light sensor is configured to indicate the receptions of light when the diverging laser beams fall on it one after another with the time delay $t_b-t_a$, and this permits formation of a conical reference surface. If the light sensor is adapted to indicate the receptions of the beams with the time delay $t_a$, it is also possible to produce a horizontal surface.

Since the equations (12) to (14) contain the term of the rotation cycle T of the rotary laser apparatus, any unevenness in the rotations of the diverging laser beams may affect a measurement accuracy for the elevation-angle or depression-angle γ. Normally, in these embodiments, a motor of high rotation accuracy is used to rotate the diverging laser beams, but since the equation (2) does not contain the term of the rotation cycle T, the measurement accuracy would not be degraded unless the rotations of the diverging laser beams are uneven for a short time of period from the reception of the diverging beam b1 to the reception of the diverging beam b3. Thus, an exemplary model where the diverging beam is detected three times during a single rotation of the rotary laser apparatus is less influenced by an error caused by the uneven rotations than another exemplary model where the diverging beam is detected twice during the same period of time.

Figure 29:
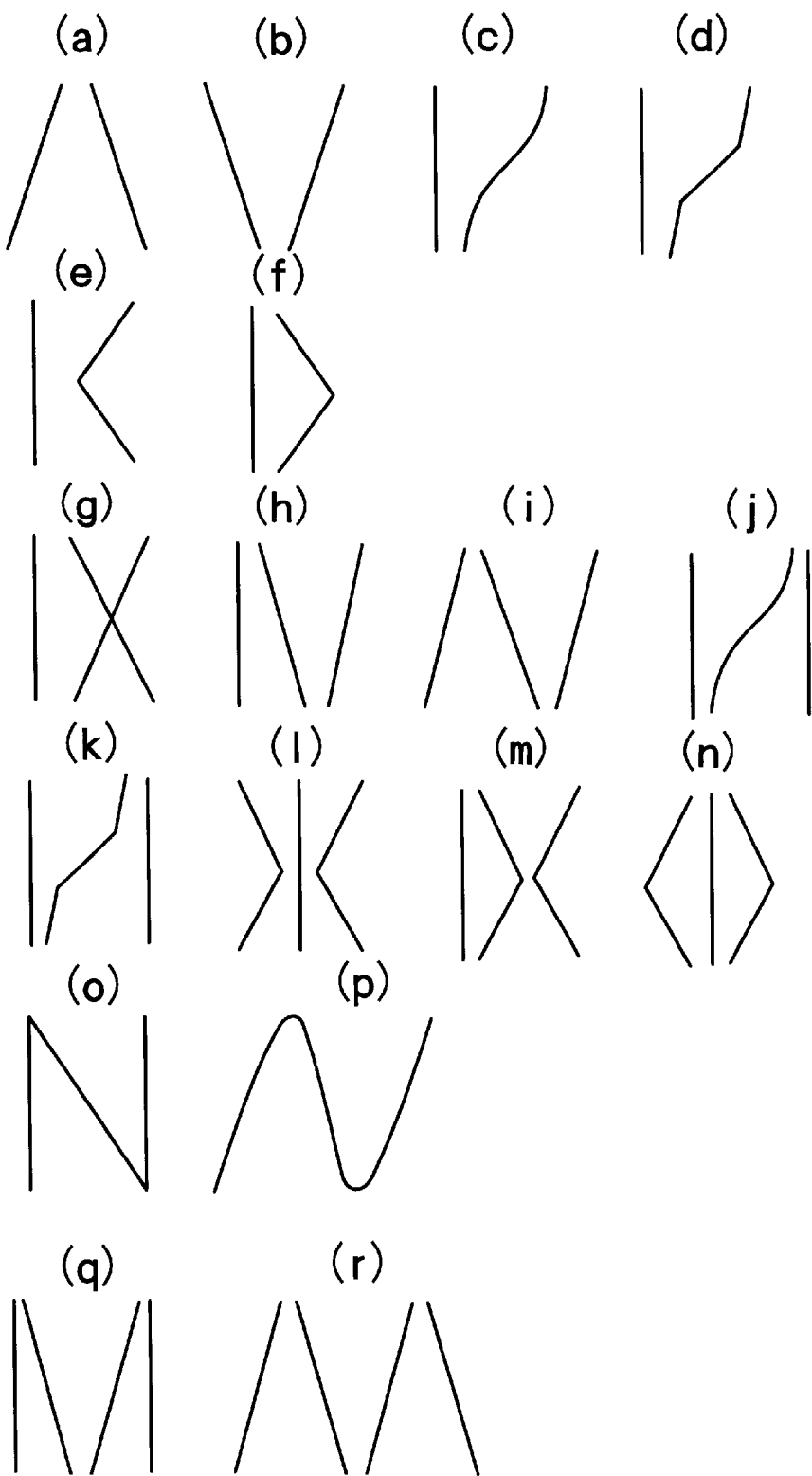
FIG. 29 is a diagram showing other various combined forms of the diverging laser beams.

(2.1.5) Rotary Laser Apparatus Emitting Diverging Laser Beams of Various Formats The above-mentioned embodiments include a type of the rotary laser apparatus that emits three diverging laser beams b1, b2, and b3 generally arranged in an N-shape as in FIG. 3 and another type of the rotary laser apparatus that emits two diverging laser beams b51 and b52 generally arranged in a V-shape as shown in FIG. 27, and the arrangement of the laser beams and the number of them can be varied as desired. Other examples of the arrangement of the diverging laser beams are depicted in FIGS. 29(a) to 29(r). All the diverging laser beams can easily be implemented by appropriately altering the diffracting lattice 134 in FIG. 5.

As with the diverging laser beams as illustrated in FIGS. 29(a) to 29(f), diverging laser beam is detected twice for a period of time during which the rotary laser apparatus makes a single turn. Thus, the equations (12) to (14) and other modified formulas may be used to obtain the elevation-angle or depression-angle γ.

As to the diverging laser beams illustrated in FIGS. 29(g) to 29(p), the light receiving unit 156 in the light sensor 154 detects the diverging laser beam three times for a period of time during which the rotary laser apparatus makes a single rotation. Thus, the measurement principle explained in conjunction with the first preferred embodiment can be used to compute the elevation-angle or depression-angle γ.

For the diverging laser beams illustrated in FIGS. 29(q) and 29(r), the diverging laser beam is detected four times for a period of time during which the rotary laser apparatus 151 makes a single turn. Thus, selecting three out of the four detection results of the diverging beams and computing in relation with the selected beams, four ways of arithmetic operations can be carried out for the elevation-angle or depression-angle γ. Those results of the elevation-angle or depression-angle γ can be averaged to enhance the measurement accuracy for the angle γ. Additionally, the number of the diverging laser beams is increased to get the increased number of data samples subjected to the averaging for the purpose of improving the measurement accuracy.

The diverging laser beams depicted in FIGS. 29(c), 29(d), 29(j), and 29(k) include diverging laser beam featured with a moderate inclination close to the horizontal plane and a sudden steep inclination away from the horizontal plane, and hence, a rate of a variation in the elevation-angle or depression-angle γ to a variation in the time delay between the receptions of the beams is altered from zone close to the horizontal plane to zone apart from the horizontal plane. This permits an enhanced sensitivity in measuring the elevation-angle or depression-angle γ close to the horizontal plane.

Herein, an operation pattern in which the diverging laser beam is detected n times for a period of time during which the rotary laser apparatus makes a single turn is referred to as "substantially n of the diverging laser beams".

(2.1.6) Rotary Laser Apparatus Used with Radio Wave for Transmitting Rotational Angular Positions Another embodiment of the principle of measuring the rotational angular positions ζ and ξ will now be described. In the first preferred embodiment, the laser beam S is used to transmit the information on the rotational angular position ζ from the rotary laser apparatus 151 to the light sensor 154, and instead, the laser beam may herein be replaced with radio waves to transmit the information on the rotational angular position ζ. In such a case, the optics incorporated in the projector 103 of the rotary laser apparatus 11 to emit the laser beam S may be omitted. The optics used to emit the laser beam S is replaced with a radio wave transmitter (not shown) surrounded in a casing 101 of the rotary laser apparatus 151 to transmit the information on the rotational angular position ζ to the light sensor 154. Correspondingly, the light sensor 154 is provided with a radio wave receiver (not shown) to receive the information on the rotational angular position ζ transmitted from the rotary laser apparatus 151. Description of the light receiving unit 155 incorporated in the light sensor 154 to receive the laser beam S is omitted. The procedure of transmitting the information on the rotational angular position ζ is the same as in the first preferred embodiment except that a transmission medium is changed from laser beam to radio waves.

(2.1.7) Rotary Laser Apparatus where Laser Beam is Shared between Use as Diverging Laser Beams and Use as Laser Beam Carrying Rotational Angular Position Any of the diverging laser beams b1, b2, and b3 may be modulated to represent information on the rotational angular position so that the laser beam is shared between a use as the diverging laser beams and a use as the laser beam S carrying the rotational angular position.

(2.1.8) Rotary Laser Apparatuses Transmitting Deviation Angles by Means of Optical Communication A deviation angle detected by the deviation detecting device 190 may be transmitted to the light sensor 154 by means of optical communication. Transmission of the deviation angle through optical communication can be implemented with completely the same configuration as that used for transmitting rotation angular positions by means of the optical communication. Beams can be commonly used for either purpose of transmitting a deviation angle or transmitting a rotational angular position. Alternatively, the diverging laser beams b1, b2, b3 may be modulated, respectively, and resultantly, those diverging laser beams can also be used to transmit the deviation angle.

Figure 30:
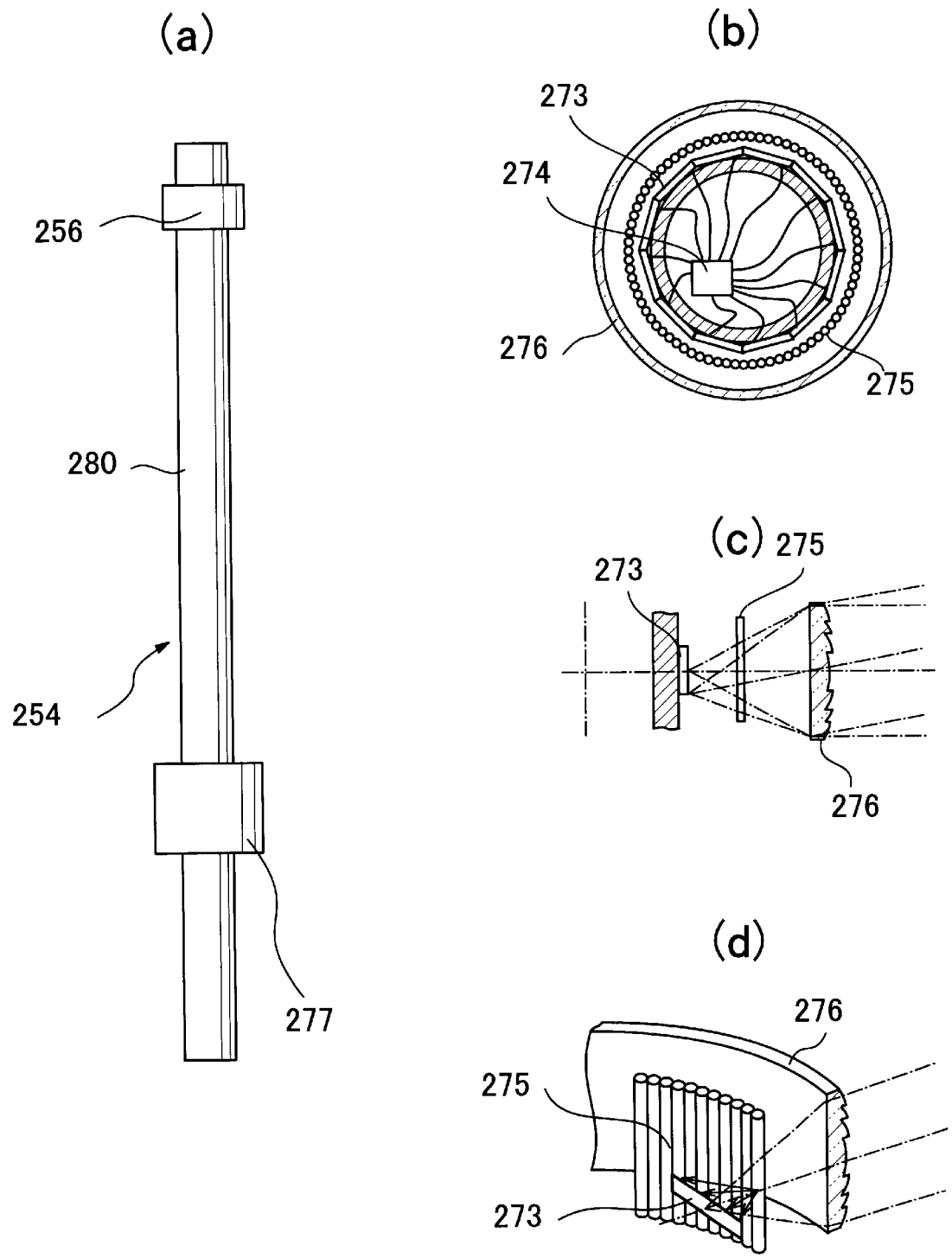
FIG. 30 shows front and partial sectional views of the light sensor capable of receiving light in an omnidirectional manner.

(2.2) Alternative Embodiment of Light Sensor (2.2.1) Light Sensor Capable of Omnidirectionally Receiving Light FIGS. 30(a) to 30(d) show an embodiment of the light sensor 254 capable of omnidirectionally receiving light. As can be seen in FIG. 30(a), the omnidirectionally light sensor 254 has a supporting rod 280, a light receiving unit 256, and a light sensor controller 277. The light receiving nit 256 is attached to an upper portion of the supporting rod 280 while the light sensor controller 277 is affixed to a lower part of the supporting rod. FIG. 30(b) shows a top cross-sectional view showing the light receiving unit 256, FIG. 30(c) shows a side cross-sectional view, and FIG. 30(d) is a partially cut-away sectional view. Referring to FIGS. 30(b) to 30(d), the light receiving unit 256 has an annular cylindrical Fresnel lens serving as a converging means, an annular fiber sheet 275, and a plurality of light receiving elements 273 deployed in an annular formation, and these components are all disposed along a concentric circle. Additionally, a light receiving element controller 274 is provided inside the light receiving elements 273 annularly disposed.

Figure 31:
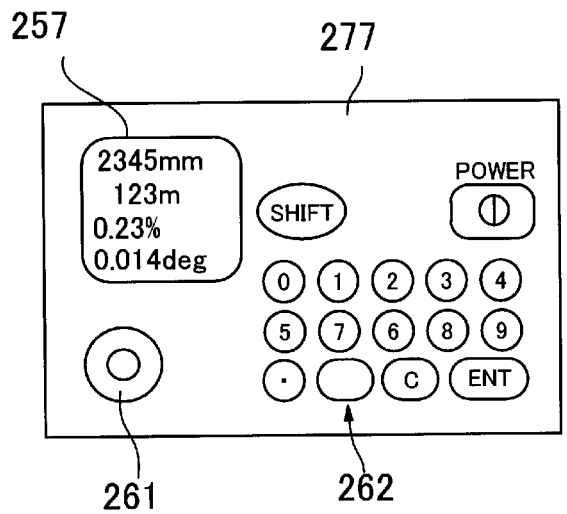
FIG. 31 shows front and sectional views of a light sensor controller incorporated in the ominidirectional light sensor.
Figure 31:
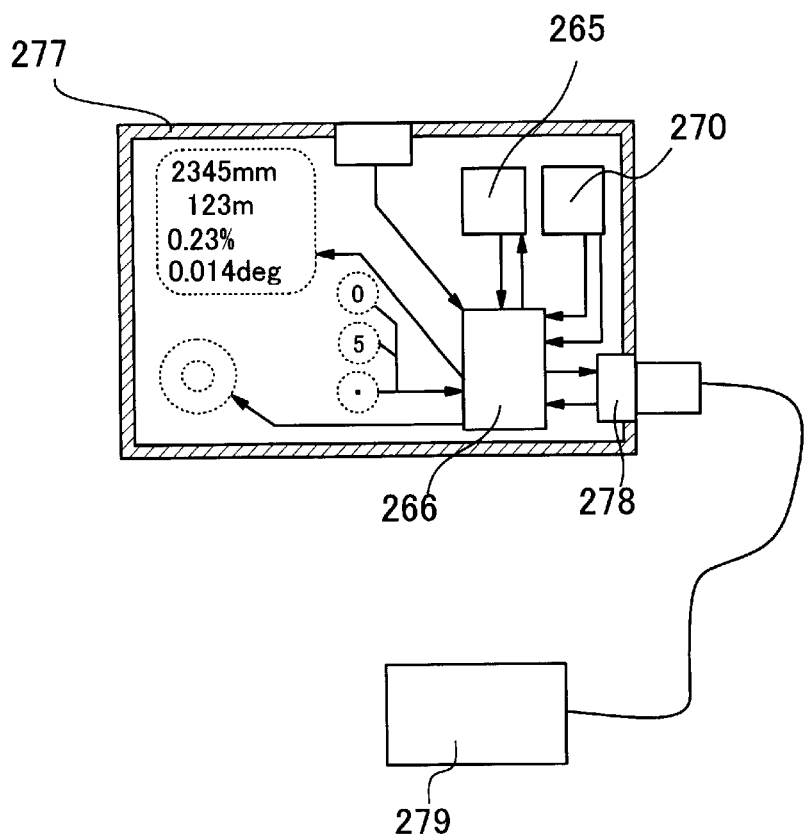
Figure 32:
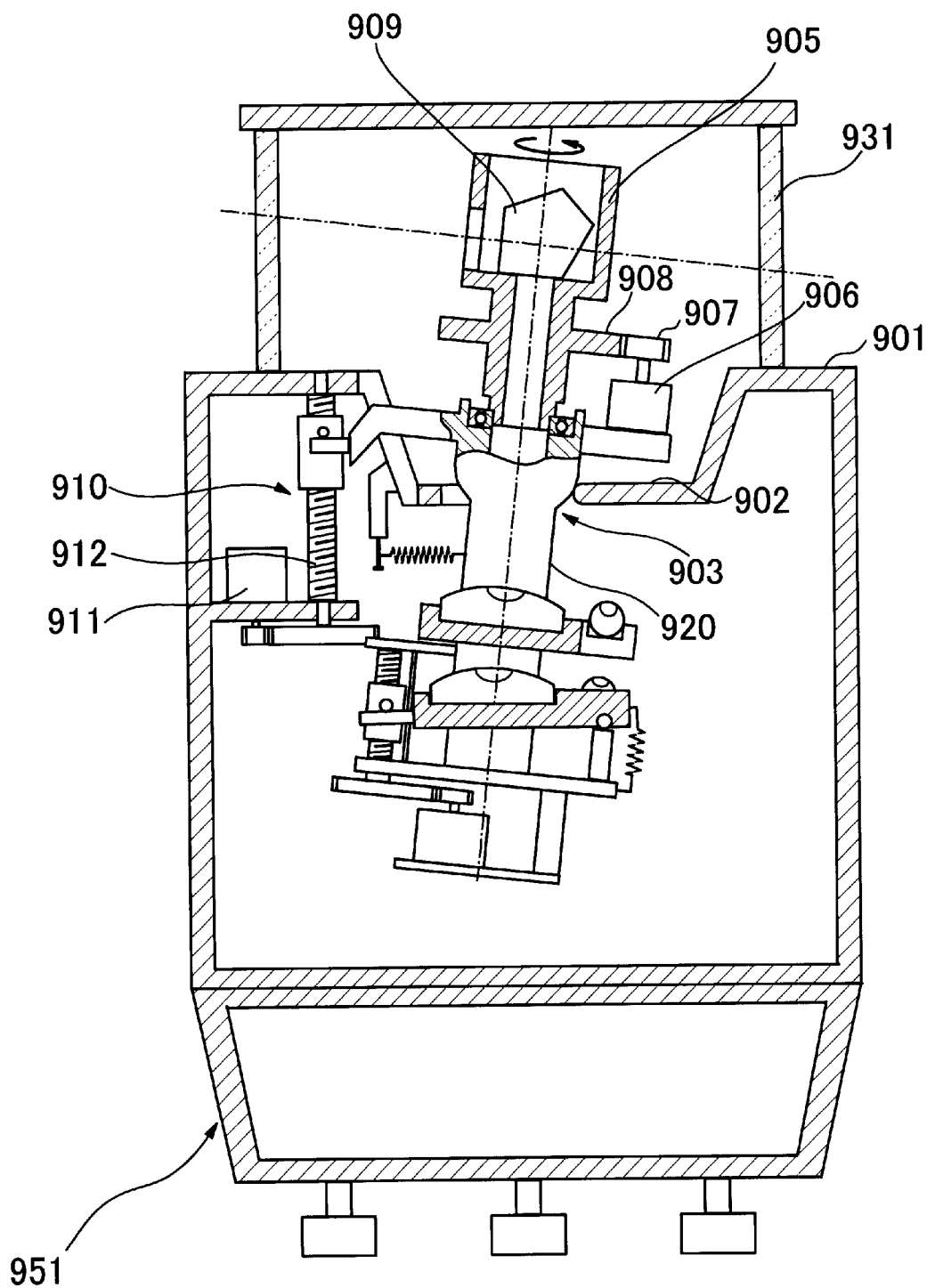
FIG. 32 is a sectional view showing a prior art rotary laser apparatus.

As shown in FIG. 31(a) and its cross-section of FIG. 31(b), the light sensor controller 277 includes a display 257, an alarm 261 such as a buzzer, entry keys 262, a memory 265, an operational unit 266, an electric wave receiver 270 receiving information on the rotational angular position, and an external communication unit 278. Further, the light sensor controller 277 can be connected to an external computer 279 via the external communication unit 278. The external computer 279 permits entry of data, display of measurement results, and subsequent processing of the measurement results.

When the diverging laser beam falls upon the light receiving unit 256, the diverging laser is converged through the fiber sheet 275 to the light receiving element 273 by the cylindrical Fresnel lens 276 having directivity in an elevating or depressing direction. Since the diverging beam converged by the cylindrical Fresnel lens 276 is scattered in horizontal directions by the fiber sheet 275, the incident diverging beam uniformly falls upon the light receiving element 273. With such a configuration, any disturbing light other than that having the directivity inherent to the cylindrical Fresnel lens 276 would not fall upon the light receiving element 273, and hence, a S/N ratio of a light sensing signal developed by the reception of the incident diverging beam can be enhanced. The light receiving elements 273 are connected to the light receiving element controller 274 in parallel with each other to determine a condition of light incident upon the light receiving elements 273, and then, circuitry of any of the light receiving elements 273 receiving no incident diverging beam is broken to further improve the S/N ratio of the light sensing signal.

When the incident diverging laser beam falls upon the light receiving elements 273, the light sensing signal is transmitted to the light receiving element controller 274. The light receiving element controller 274 built in the light receiving unit 256 transmits the light sensing signal to the light sensor controller 277. Processing of the signal in the light sensor controller 277 is the same as the processing of the signal in the light sensor 154.

Although the preferred embodiments of the present invention have been described, the disclosures herein can be modified in a various range without departing from the true scope and spirit of the invention as technically defined in the appended claims.

Accordingly, the present invention provides a deviation detecting device that detects a deviation angle of a rotary unit relative to a projector body, and also provides a rotary laser apparatus incorporated with the deviation detecting device and a position determining system.

Also, the present invention provides a rotary laser apparatus and a position determining system that cooperatively function to use a deviation angle detected by the deviation detecting device and correct a position determined or a plane defined on the detected deviation angle.

What is claimed is:

1. A deviation detecting device, comprising
a light emitter attached to a projector body of a laser light projector for emitting laser light,
a reflector attached to a rotary unit of the laser light projector for reflecting light emitted from the light emitter, and
a light receiving element attached to the projector body of the laser light projector for receiving the light reflected by the reflector, a position at which the light reflected by the reflector is incident upon the light receiving unit being utilized to determine a deviation angle of the rotary unit relative to the projector body.

2. A deviation detecting device according to claim 1, further comprising a first capacitor lens collimating the light emitted from the light emitter to direct the light at the reflector, and a second capacitor lens converging the light reflected by the reflector to make the light fall on the light receiving element.

3. A deviation detecting device according to claim 1, wherein the light receiving element is a quadrant, a semiconductor position detector, or a CCD.

4. A rotary laser apparatus incorporated with a deviation detecting device as defined in claim 1, comprising a laser light projector that has a projector body and a rotary unit, and a casing surrounding the laser light projector, the laser light projector emitting laser beam while simultaneously rotating the laser beam, the laser light projector including the deviation detecting device.

5. A position determining system in combination with a rotary laser apparatus incorporated with a deviation detecting device, as defined in claim 4, comprising a light sensor that receives laser light emitted from the rotary laser apparatus, the laser light received at the light sensor being utilized to determine a position, so as to obtain a value of the determined position or to produce a plane on the value of the determined position, the light sensor including an arithmetic operation unit that utilizes a deviation angle detected by the deviation detecting device to correct the value of the determined position.

* * * * *